(12) United States Patent
Hyakudai et al.

(10) Patent No.: US 12,306,787 B2
(45) Date of Patent: *May 20, 2025

(54) COMMUNICATION DEVICE, COMMUNICATION SYSTEM, AND COMMUNICATION METHOD

(71) Applicant: Sony Semiconductor Solutions Corporation, Kanagawa (JP)

(72) Inventors: Toshihisa Hyakudai, San Diego, CA (US); Junya Yamada, Kanagawa (JP); Satoshi Ota, Kanagawa (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/601,274

(22) Filed: Mar. 11, 2024

(65) Prior Publication Data
US 2024/0330233 A1  Oct. 3, 2024

Related U.S. Application Data

(63) Continuation of application No. 17/405,334, filed on Aug. 18, 2021, now Pat. No. 11,971,842.
(Continued)

(51) Int. Cl.
*G06F 13/42* (2006.01)
*G06F 1/12* (2006.01)
(Continued)

(52) U.S. Cl.
CPC ............ *G06F 13/4291* (2013.01); *G06F 1/12* (2013.01); *G06F 13/1668* (2013.01);
(Continued)

(58) Field of Classification Search
CPC .... G06F 13/4291; G06F 1/12; G06F 13/1668; G06F 13/4282; G06F 13/4295; H04L 7/0012
See application file for complete search history.

(56) References Cited

U.S. PATENT DOCUMENTS

| 11,971,842 B2* | 4/2024 | Hyakudai ........... G06F 13/4295 |
| 2002/0133662 A1 | 9/2002 | Cheung |

(Continued)

FOREIGN PATENT DOCUMENTS

| CN | 1851682 A | 10/2006 |
| JP | 2011-239011 A | 11/2011 |

(Continued)

OTHER PUBLICATIONS

International Search Report dated Nov. 16, 2021 for corresponding International Application No. PCT/JP2021/031014.

*Primary Examiner* — Glenn A. Auve
(74) *Attorney, Agent, or Firm* — Michael Best & Friedrich LLP

(57) ABSTRACT

A communication device includes communication circuitry configured to transmit a serial signal group conforming to a serial peripheral interface (SPI) and transmitted from a master in synchronization with a clock to a communication partner device as a batch of data blocks within one frame period of a predetermined communication protocol, or transmit the serial signal group to the communication partner device as a plurality of data blocks divided according to a plurality of frame periods.

18 Claims, 15 Drawing Sheets

Related U.S. Application Data

(60) Provisional application No. 63/071,119, filed on Aug. 27, 2020.

(51) Int. Cl.
  *G06F 13/16* (2006.01)
  *G06F 13/40* (2006.01)
  *H04L 7/00* (2006.01)

(52) U.S. Cl.
  CPC ...... *G06F 13/4009* (2013.01); *G06F 13/4282* (2013.01); *G06F 13/4295* (2013.01); *H04L 7/0012* (2013.01)

(56) References Cited

U.S. PATENT DOCUMENTS

| | | |
|---|---|---|
| 2011/0225339 A1 | 9/2011 | Chen |
| 2012/0017223 A1 | 1/2012 | Russo |
| 2012/0089754 A1 | 4/2012 | Su et al. |
| 2016/0098371 A1 | 4/2016 | Murtaza et al. |

FOREIGN PATENT DOCUMENTS

| | | |
|---|---|---|
| JP | 2015080045 A | 4/2015 |
| JP | 2015080054 A | 4/2015 |
| JP | 2017004238 A | 1/2017 |
| JP | 2018046547 A | 3/2018 |
| JP | 2018056682 A | 4/2018 |

* cited by examiner

MODE 0

MODE 1

MODE 2

MODE 3

FIG. 5

| No. | NAME | FUNCTION Master→Slave | FUNCTION Slave→Master | | DESCRIPTION |
|---|---|---|---|---|---|
| C-1 | TRANSMISSION MODE | COMMAND | STATE MONITOR | 0 | TRANSMIT ALL SPI FRAMES BY 1TDD BURST |
| | | | | 1 | TRANSMIT 1DB OF SPI FRAME BY 1TDD BURST |
| | | | | OTHERS | SPARE |
| C-2 | CSn | COMMAND | STATE MONITOR | SELECT Slave BY Master, CSn CAN SPECIFY NOT ONLY Slave BUT ALSO PLURALITY OF Slaves AND ALSO CAN SPECIFY S_SerDes | |
| C-3 | SCK FREQUENCY | COMMAND | STATE MONITOR | SCK FREQUENCY ON Slave SIDE | |
| C-4 | SPI MODE | COMMAND | STATE MONITOR | 0 | CPOL=0, CPHA=0 |
| | | | | 1 | CPOL=0, CPHA=1 |
| | | | | 2 | CPOL=1, CPHA=1 |
| | | | | 3 | CPOL=1, CPHA=0 |
| C-5 | TOTAL NUMBER OF DBS | INFORMATION | STATE MONITOR | Master→Slave : TOTAL NUMBER OF 1SPI FRAMES. TOTAL NUMBER=1 WHEN TRANSMISSION MODE=1 Slave→Master : NUMBER OF DBS RECEIVED AFTER SPI START | |
| C-6 | CURRENT DB POSITION | INFORMATION | NA. | 0 | SELECTED WHEN TRANSMISSION MODE=0 |
| | | | | 1 | HEAD DB ON SPI FRAME |
| | | | | 2 | OTHER THAN HEAD DB AND LAST DB |
| | | | | 3 | LAST DB ON SPI FRAME |
| C-7 | CURRENT DB STATE | INFORMATION | INFORMATION | 0 : dummy, 1 : VALID | |
| C-8 | DB SIZE | INFORMATION | STATE MONITOR | TRANSMISSION DATA SIZE (BYTE UNITS), MAXIMUM 511 BYTES | |
| C-9 | Slave INTERRUPT | NA. | INTERRUPT FLAG | 0: NO INTERRUPT, 1: INTERRUPT | |
| C-10 | OPERATION STATE ON SLAVE SIDE | NA. | STATE MONITOR | 0 | NORMAL STATE |
| | | | | 1 | BUSY (DCP BUFFER IS EMPTY) |
| | | | | 2 | ERROR (SPI PACKET IS DESTROYED) |
| | | | | OTHERS | SPARE |
| C-11 | SPI BLOCK RESET | COMMAND | NA. | 0: -, 1: RESET COMMAND OF SPI BLOCK OF S_SerDes | |
| D-1 | DATA | MOSI DATA | MISO DATA | SPI DATA | |
| E-1 | CRC | CRC | CRC | CRC PARITY | |

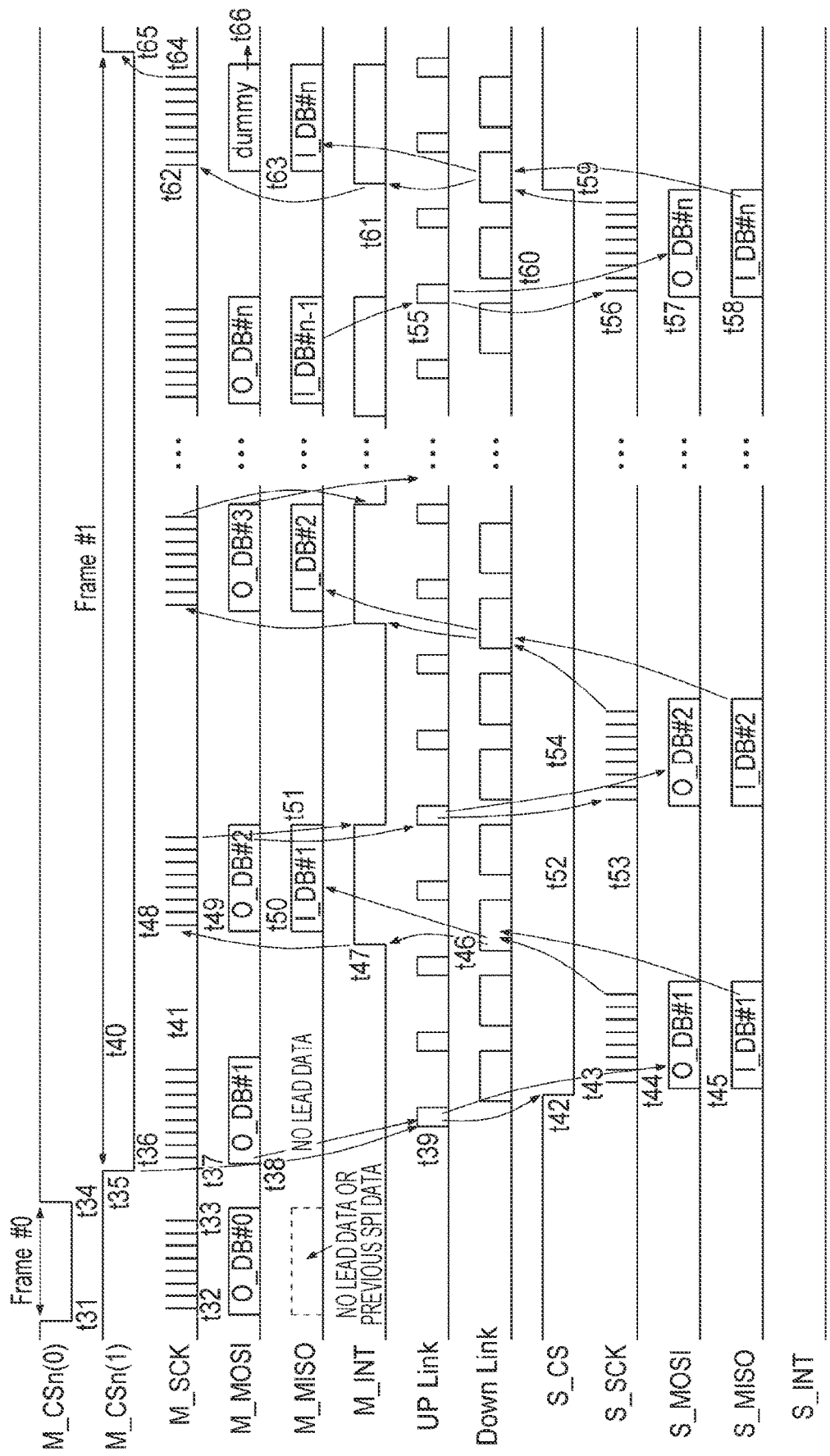

COMMUNICATION DEVICE, COMMUNICATION SYSTEM, AND COMMUNICATION METHOD

CROSS REFERENCE TO RELATED APPLICATIONS

This application is a Continuation Application of patent application Ser. No. 17/405,334, filed Aug. 18, 2021, which claims the benefit of U.S. provisional application No. 63/071,119, filed Aug. 27, 2020, the entire contents of which are incorporated herein by reference.

TECHNICAL FIELD

The present disclosure relates to a communication device, a communication system, and a communication method.

BACKGROUND ART

A technique for performing high-speed serial communication between a SerDes for master and a SerDes for slave has been proposed (see PTL 1).

In a case where serial communication is performed between two SerDeses, for example, a frequency division duplexing (FDD) method or a time division duplex (TDD) method is used. In a case where there is a large difference between the amount of data transmitted from one SerDes to the other SerDes and the amount of data transmitted from the other SerDes to the one SerDes, it is conceivable to employ the TDD method to make a difference in data transmission capacity between an uplink direction and a downlink direction. The TDD method is a half-duplex communication method incapable of performing communication in the uplink direction and communication in the downlink direction at the same time, and capable of performing communication in only one direction.

CITATION LIST

Patent Literature

[PTL 1]
JP 2011-239011 A

SUMMARY

Technical Problem

One of serial communication standards is called serial peripheral interface (SPI). The SPI is a full-duplex communication method capable of simultaneously performing uplink and downlink communications. In a case where each of the above-described two SerDeses transmits SPI data to a communication device connected to the SerDes on the opposite side connected to the each SerDes itself via the SerDes while communicating with another communication device by SPI, it is difficult for the SPI data itself by the full-duplex communication method to be transmitted by the TDD method of the half-duplex communication method, assuming the case where the two SerDeses communicate by the TDD method.

Therefore, the present disclosure provides a communication device, a communication system, and a communication method capable of performing serial communication at high speed by combining different communication methods.

Solution to Problem

According to an embodiment of the present disclosure, there is provided a communication device including a communication unit that transmits a serial signal group conforming to a serial peripheral interface (SPI) and transmitted from a master in synchronization with a clock to a communication partner device as a batch of data blocks within one frame period of a predetermined communication protocol, or transmits the serial signal group to the communication partner device as a plurality of data blocks divided according to a plurality of frame periods.

There may be provided a memory configured to store a first serial signal group conforming to the SPI and transmitted from the master in synchronization with the clock, and store a second serial signal group conforming to the SPI and transmitted from a slave in synchronization with the clock;
 a packet encoder configured to convert the first serial signal group stored in the memory into a first packet of the predetermined communication protocol; and
 a packet decoder configured to convert a second packet of the predetermined communication protocol received from the communication partner device into the second serial signal group.

The first packet may include frequency information of the clock, polarity information, and phase information of the clock with respect to a data signal of the first serial signal group confirming to the SPI.

The first packet may include information indicating that the batch of data blocks is included within the one frame period, or information indicating that the plurality of data blocks divided according to the plurality of frame periods is included.

In a case where the first packet includes the plurality of data blocks, the first packet may include a total number of the plurality of data blocks and division position information of the data blocks.

The first packet may include size information of the data block.

The first packet may include information indicating whether the data block is valid or invalid.

The first packet may include information indicating that the slave is reset.

The second packet may include at least one of information indicating an operation state of the slave and interrupt information from the slave.

The memory may determine that the slave requests readout of a state of the slave and transmit an interrupt signal to the master in a case where the interrupt information is included in the second packet or in a case where the second packet itself arrives at the memory from the communication partner device.

The first packet may include information of a slave select signal included in the first serial signal group conforming to the SPI for selecting the communication partner device or the slave.

The packet encoder may transmit the first packet to the communication partner device or the slave selected by the slave select signal as a destination.

There may be provided a shift register configured to sequentially store each serial signal included in the first serial signal group in the memory in synchronization with the clock, and sequentially transmit each serial signal included in the second serial signal group to the master in synchronization with the clock.

The communication unit may transmit the first packet at first timing defined by the predetermined communication protocol and receive the second packet at second timing defined by the predetermined communication protocol.

The packet encoder may determine that transmission of the first serial signal group from the master is completed when a slave select signal transmitted from the master transitions from a first logic to a second logic.

The communication unit may transmit and receive the first packet and the second packet to and from the communication partner device using the communication protocol according to time division duplex (TDD).

According to an embodiment of the present disclosure, there is provided a communication device including: a communication unit configured to transmit a serial signal group conforming to an SPI and transmitted from a slave in synchronization with a clock generated on the basis of clock frequency information included in a packet from a communication partner device to the communication partner device as a batch of data blocks within one frame period of a predetermined communication protocol, or transmit the serial signal group to the communication partner device as a plurality of data blocks divided according to a plurality of frame periods.

There may be provided a packet decoder configured to convert a first packet of a predetermined communication protocol received from the communication partner device into a first serial signal group conforming to the SPI; a clock generator configured to generate the clock on the basis of the clock frequency information included in the first serial signal group;
a memory configured to store the first serial signal group in synchronization with the clock, and store a second serial signal group conforming to the SPI and transmitted from the slave in synchronization with the clock; and
a packet encoder configured to convert the second serial signal group stored in the memory into a second packet of the predetermined communication protocol.

The second packet may include information indicating that a batch of data blocks transmitted within one frame period of the second serial signal group is included, or information indicating that a plurality of data blocks divided and transmitted according to a plurality of frame periods is included.

The second packet may include information indicating whether or not the slave is in a busy state in which the slave is not able to receive the first serial signal group, and information indicating whether or not there is an error in the first serial signal group received by the slave.

The second packet may include interrupt information requesting that the master reads a state of the slave. There may be provided a shift register configured to store each serial signal included in the second serial signal group in the memory, and transmit each serial signal included in the first serial signal group to the slave.

The communication unit may transmit the second packet at first timing defined by the predetermined communication protocol and receive the first packet at second timing defined by the predetermined communication protocol.

The communication unit may transmit and receive the first packet and the second packet to and from the communication partner device using the communication protocol according to time division duplex (TDD).

According to an embodiment of the present disclosure, there is provided a communication system including:
a first communication device and a second communication device that transmit and receive a packet according to a predetermined communication protocol, in which
the first communication device includes a first communication unit that transmits a first serial signal group conforming to a serial peripheral interface (SPI) and transmitted from a master in synchronization with a clock to the second communication device as a batch of data blocks within one frame period of a predetermined communication protocol, or transmits the first serial signal group to the second communication device as a plurality of data blocks divided according to a plurality of frame periods, and
the second communication device transmits a second serial signal group conforming to the SPI and transmitted from a slave in synchronization with a clock generated on the basis of clock frequency information included in the packet transmitted from the first communication device to the first communication device as a batch of data blocks within one frame period of the predetermined communication protocol, or transmits the second serial signal group to the first communication device as a plurality of data blocks divided according to a plurality of frame periods.

The first communication device may include
a first memory that stores the first serial signal group transmitted from the master in synchronization with a first clock and stores the second serial signal group transmitted from the slave in synchronization with the first clock,
a first packet encoder that converts the first serial signal group stored in the first memory into a first packet of the predetermined communication protocol,
a first packet decoder that converts a second packet of the predetermined communication protocol received from the second communication device into the second serial signal group, and
the first communication unit that transmits the first packet at timing defined in the predetermined communication protocol and receives the second packet at timing defined in the predetermined communication protocol, and
the second communication device may include
a second packet decoder that converts the received first packet into the first serial signal group,
a clock generator that generates a second clock on the basis of the clock frequency information included in the first serial signal group,
a second memory that stores the first serial signal group in synchronization with the second clock and stores the second serial signal group transmitted from the slave in synchronization with the second clock,
a packet encoder that converts the second serial signal group stored in the second memory into the second packet, and
a second communication unit that transmits the second packet at timing defined in the predetermined communication protocol and receives the first packet at timing defined in the predetermined communication protocol.

According to an embodiment of the present disclosure, there is provided a communication method including: a communication unit configured to transmit a serial signal group conforming to an SPI and transmitted from a master in synchronization with a clock to a communication partner device as a batch of data blocks within one frame period of a predetermined communication protocol, or transmit the serial signal group to the communication partner device as a plurality of data blocks divided according to a plurality of frame periods.

BRIEF DESCRIPTION OF DRAWINGS

FIG. 5 is a diagram for describing information included in a transmission packet generated by an ECP.

FIG. 9 is a timing chart in a case of repeating processing of transmitting divided data within one frame period over a plurality of frames.

DESCRIPTION OF EMBODIMENTS

Hereinafter, embodiments of a communication device, a communication system, and a communication method will be described with reference to the drawings. Although principal components of the communication device, the communication system, and the communication method will be mainly described below, the communication device, the communication system, and the communication method may include components and functions that are not illustrated or described. The following description does not exclude components or functions not illustrated or described.

First Embodiment

Figure 1:
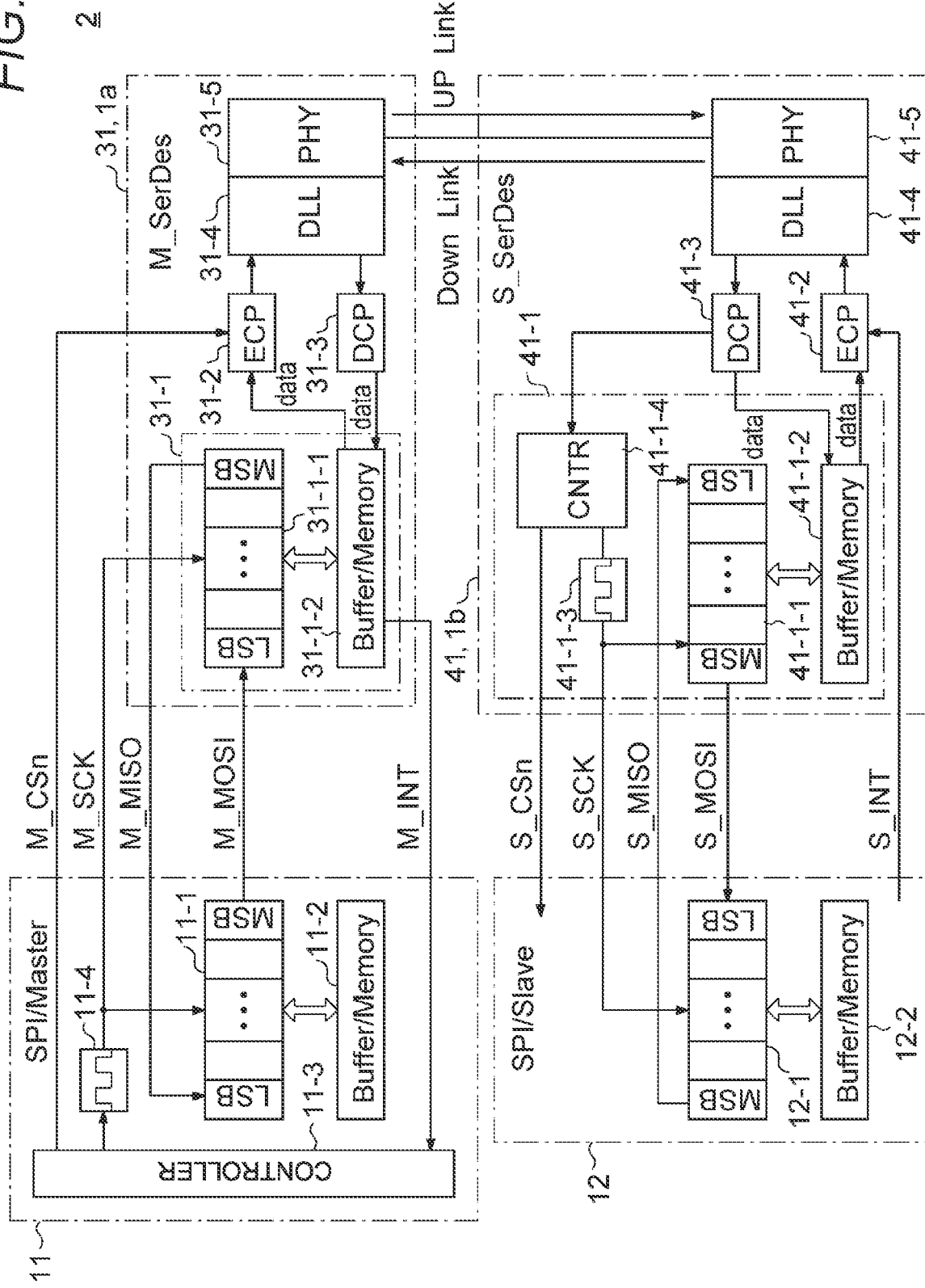
FIG. 1 is a block diagram illustrating a schematic configuration of a communication system including a communication device according to a first embodiment.

FIG. 1 is a block diagram illustrating a schematic configuration of a communication system 2 including communication devices 1a and 1b according to a first embodiment. The communication system 2 in FIG. 1 includes an SPI/Master 11, a Master SerDes (M_SerDes) 31, an SPI/Slave 12, and a Slave SerDes (S_SerDes) 41. Among them, the M_SerDes 31 corresponds to the communication device 1a, and the S_SerDes 41 corresponds to the communication device 1b.

The SPI/Master 11 and the M_SerDes 31 perform serial communication (hereinafter sometimes referred to as SPI communication) conforming to an SPI. Similarly, the SPI/Slave 12 and the S_SerDes 41 perform serial communication (SPI communication) conforming to the SPI.

The M_SerDes 31 and the S_SerDes 41 perform high-speed serial communication by a TDD method. In FIG. 1, a signal transmission path from the M_SerDes 31 to the S_SerDes 41 is referred to as UP Link, and a signal transmission path from the S_SerDes 41 to the M_SerDes 31 is referred to as Down Link. In the SPI communication, serial communication is performed by a protocol (hereinafter referred to as SPI protocol) conforming to the SPI standard. Furthermore, in the present specification, serial data transmitted and received through the SPI communication may be referred to as SPI data.

As will be described below, the M_SerDes 31 includes a communication unit (DLL 31-4) that transmits a serial signal group conforming to a serial peripheral interface (SPI) and transmitted from a master (SPI_Master 11) in synchronization with a clock to a communication partner device (S_SerDes 41) as a batch of data blocks within one frame period of a predetermined communication protocol, or transmits the serial signal group to the communication partner device (S_SerDes 41) as a plurality of data blocks divided according to a plurality of frame periods. Furthermore, the S_SerDes 41 includes a communication unit (DLL 41-4) that transmits a serial signal group conforming to the SPI and transmitted from a slave (SPI_Slave 12) to the communication partner device (M_SerDes 31) as a batch of data blocks within one frame period of a predetermined communication protocol, or transmits the serial signal group to the communication partner device (M_SerDes 31) as a plurality of data blocks divided according to a plurality of frame periods, in synchronization with a clock generated on the basis of clock frequency information included in a packet from the communication partner device (M_SerDes 31).

Figure 2:
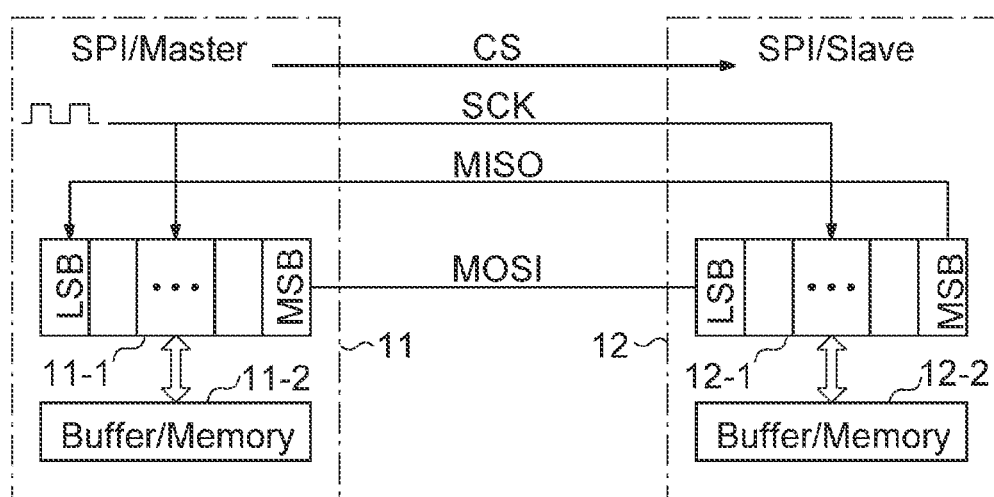
FIG. 2 is a block diagram of a portion related to SPI communication between an SPI/Master and an SPI/Slave.

FIG. 2 is a block diagram of a portion related to the SPI communication between the SPI/Master 11 and the SPI/Slave 12. Note that FIG. 2 illustrates an example in which the SPI/Master 11 and the SPI/Slave 12 directly perform the serial communication conforming to the SPI for simplification of the description.

As illustrated in FIG. 2, the SPI/Master 11 includes a shift register 11-1 and a buffer/memory 11-2. Similarly, the SPI/Slave 12 includes a shift register 12-1 and a buffer/memory 12-2.

The shift register 12-1 in the SPI/Slave 12 operates in synchronization with a clock SCK supplied from the SPI/Master 11. The shift register 11-1 in the SPI/Master 11 sequentially outputs serial data from a most significant bit (MSB) side in synchronization with the SCK. The output serial data is input to a least significant bit (LSB) side of the shift register 12-1 in the SPI/Slave 12 via a MOSI pin. Serial data output from an MSB side of the shift register 12-1 in the SPI/Slave 12 is input to a LSB side of the shift register 11-1 in the SPI/Master 11 via a MISO pin. Data held by the shift register 11-1 in the SPI/Master 11 can be stored in the buffer/memory 11-2. Furthermore, the shift register 11-1 can hold data stored in the buffer/memory 11-2.

Similarly, data held by the shift register 12-1 in the SPI/Slave 12 can be stored in the buffer/memory 12-2. Furthermore, the shift register 12-1 can hold data stored in the buffer/memory 12-2.

FIGS. 3A-D are basic signal waveform diagrams of the SPI protocol. In the SPI protocol, there are four combinations of a polarity of the SCK when a slave selector signal (CS signal) output by the SPI/Master 11 is idle (high level in FIGS. 3A-D) and an edge (rising edge or falling edge) of the clock (SCK) for latching data when the CS signal enters an active state (low level in FIGS. 3A-D). These four combinations are called SPI modes. The SPI/Master 11 can arbitrarily select one of the four SPI modes. The SPI/Master 11 knows in advance the SPI mode that the SPI/Slave can support and needs to select a corresponding mode.

FIGS. 3A to 3D are signal waveform diagrams of the four SPI modes. In SPI mode=0 illustrated in FIG. 3A, the SCK is Low when the CS signal is idle, and data is held when the SCK rises. In SPI mode=1 illustrated in FIG. 3B, the SCK is Low when the CS signal is idle, and data is held when the SCK falls. In SPI mode=2 illustrated in FIG. 3C, the SCK is High when the CS signal is idle, and data is held when the SCK falls. In SPI mode=3 illustrated in FIG. 3D, the SCK is High when the CS signal is idle, and data is held when the SCK rises.

Since the frequency of the SCK is not defined in the SPI protocol and differs for each individual device that performs the SPI communication, the SPI/Master 11 selects the frequency of the SCK for each individual device that performs the SPI communication. Therefore, the SPI/Master 11 needs to know in advance the SCK frequencies that can be supported by the devices that perform the SPI communication.

Hereinafter, a communication method using the SPI protocol will be described. In the example of FIG. 2, the communication according to the SPI protocol is performed between the SPI/Master 11 and the SPI/Slave 12.

One or a plurality of SPI/Slaves 12 may be connected to the SPI/Master 11. In the case where a plurality of SPI/Slaves 12 is connected to the SPI/Master 11, the SPI/Master 11 can have a plurality of CS signals corresponding to the plurality of SPI/Slaves 12 and can select a Slave to communicate with using a corresponding CS signal and perform communication. The CS signal for the SPI/Master 11 to select the SPI/Slave 12 to communicate with is included in the SPI control information as will be described below. The SPI/Master 11 includes the SPI control information in the SPI data and transmits the SPI data to the M_SerDes 31.

In the case of performing the SPI communication, the SPI/Master 11 sets the CS signal connected to the SPI/Slave 12 to communicate with to the active state (Low in FIGS. 3A to 3D). In the present specification, setting various signals to the active state may be referred to as assert, and setting various signals to the idle state may be referred to as deassert.

The SPI/Master 11 and the SPI/Slave 12 transfer data to be transferred from the respective buffer/memories 11-2 and 12-2 to the shift registers 11-1 and 12-1. The SPI/Master 11 generates and supplies the SCK to its own shift register 11-1 and also supplies the SCK to the shift register 12-1 in the SPI/Slave 12. Each of the shift registers 11-1 and 12-1 shifts the held data by 1 bit by toggling of the SCK. When the SCK toggles by the number of stages of the shift registers 11-1 and 12-1, the data of the shift registers 11-1 and 12-1 are switched. Then, the SPI/Master 11 transitions the CS signal to the idle state (High in FIGS. 3A to 3D). The SPI/Master 11 and the SPI/Slave 12 can acquire data from the buffer/memories 11-2 and 12-2 by transferring the data of the shift registers 11-1 and 12-1 at that time to the buffer/memories 11-2 and 12-2, whereby the SPI communication is terminated.

FIG. 2 illustrates an example in which the SPI/Master 11 and the SPI/Slave 12 directly perform the SPI communication, but in FIG. 1, the M_SerDes 31 and the S_SerDes 41 are arranged between the SPI/Master 11 and the M_SerDes 31. In FIG. 1, the SPI/Master 11 and the M_SerDes 31 perform the SPI communication, the M_SerDes 31 and the S_SerDes 41 perform the serial communication by the TDD method, and the SPI/Slave 12 and the S_SerDes 41 perform the SPI communication.

Figure 4:
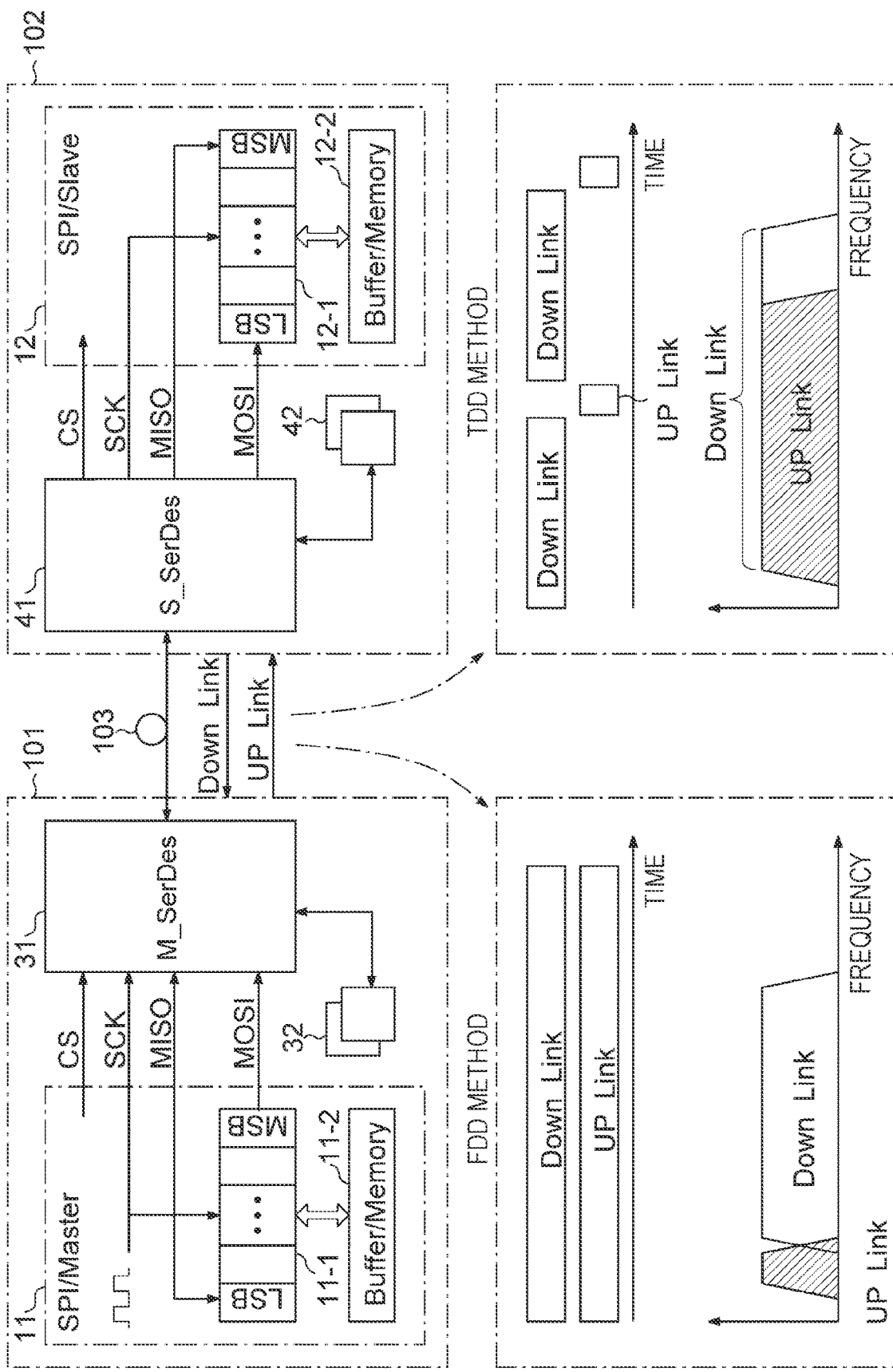
FIG. 4 is a diagram for describing a TDD method performed between an M_SerDes and an S_SerDes in FIG. 1.

FIG. 4 is a diagram for describing the TDD method performed between the M_SerDes 31 and the S_SerDes 41 in FIG. 1. FIG. 4 illustrates a simplified internal configuration of the SPI/Master 11 and the SPI/Slave 12 illustrated in FIG. 1. Furthermore, FIG. 4 illustrates an example in which peripheral devices 32 and 42 are connected to the M_SerDes 31 and the S_SerDes 41, respectively.

The M_SerDes 31 and the S_SerDes 41 are connected to each other by a cable 103 of several to ten meters or so, for example. The M_SerDes 31 and the S_SerDes 41 perform high-speed serial communication via the cable 103. Note that there may be two or more devices that perform serial communication with the M_SerDes 31. In this case, each device has a configuration similar to the S_SerDes 41 in FIG. 4. Furthermore, a plurality of sets each including two devices having similar configurations to the M_SerDes 31 and the S_SerDes 41 in FIG. 4 may be provided, and the high-speed serial communication may be performed for each set. The M_SerDes 31 and the S_SerDes 41 in FIG. 4 can be widely applied to use such as an in-vehicle camera module for transmitting and receiving a large amount of data.

The M_SerDes 31 and the S_SerDes 41 perform the high-speed serial communication by the TDD method. Timing and a frequency band of the TDD method are illustrated in the lower right of FIG. 4. In the TDD method, as illustrated on the right side of FIG. 4, an uplink signal transmission period and a downlink signal transmission period are provided so as not to temporally overlap each other within one TDD cycle. The example of the TDD timing chart in FIG. 4 illustrates an example in which the signal transmission period of an uplink signal (referred to as UP Link) from the M_SerDes 31 to the S_SerDes 41 is extremely shorter than the signal transmission period of a downlink signal (referred to as Down Link) from the S_SerDes 41 to the M_SerDes 31, that is, an example in which a signal ratio of the UP Link is extremely smaller than a signal ratio of the Down Link. For example, in a case of transmitting a video signal captured by a sensor in the S_SerDes 41 to the M_SerDes 31, the signal ratio becomes as illustrated in the TDD timing chart of FIG. 4.

On the right side of FIG. 4, the frequency band used for UP Link signal transmission and the frequency band used for Down Link signal transmission in the TDD method are illustrated. As illustrated, in the TDD method, most of the frequency bands overlap in the UP Link signal transmission and the Down Link signal transmission. For example, in the case of transmitting a video signal captured by the sensor in the S_SerDes 41 to the M_SerDes 31, the downlink Down Link signal transmission having a large signal amount needs a wider frequency band than the uplink UP Link signal transmission, and is thus performed using a wider frequency band including the frequency band used for the uplink UP Link signal transmission. In the TDD method, since the downlink Down Link signal transmission period does not overlap with the uplink UP Link signal transmission period, an echo cancellation circuit for separating both the signals is unnecessary. The M_SerDes 31 and the S_SerDes 41 according to the present embodiment are assumed to perform the signal transmission by the TDD method but may perform the signal transmission by the FDD method in some cases. Timing and a frequency band of the FDD method are illustrated in the lower left of FIG. 4. In the FDD method, the frequency band used for signal transmission from the M_SerDes 31 to the S_SerDes 41 is different from the frequency band used for signal transmission from the S_SerDes 41 to the M_SerDes 31. Therefore, the signal transmission from the M_SerDes 31 to the S_SerDes 41 and the signal transmission from the S_SerDes 41 to the M_SerDes 31 can be performed at the same timing, and the uplink signal transmission and the downlink signal transmission can be performed using the entire period within one FDD cycle. Furthermore, in the FDD method, the upstream signal transmission having a large signal amount is performed using a wide frequency band on a high frequency side. The downlink signal transmission with a small signal amount is performed using a narrow frequency band on a low frequency side. In the lower left example of FIG. 4, to increase the utilization efficiency of the frequency, the frequency band used in the uplink signal transmission and the frequency band used in the downlink signal transmission are caused to partially overlap. This overlapping portion needs an echo cancellation circuit. The echo cancellation circuit is a circuit that accurately separates an uplink signal and a downlink signal.

Hereinafter, an example will be described in which the M_SerDes 31 and the S_SerDes 41 perform high-speed serial communication by the TDD method, the M_SerDes 31 performs serial communication conforming to the SPI with the SPI/Master 11, and the S_SerDes 41 performs serial communication conforming to the SPI with SPI/Slave 12. Since the serial communication by the TDD method instead of the SPI is performed between the M_SerDes 31 and the S_SerDes 41, it is necessary to perform protocol conversion inside the M_SerDes 31 and the S_SerDes 41. Furthermore, while the serial communication by the SPI is the full-duplex communication method, the serial communication by the TDD method is the half-duplex communication method, and thus it is difficult for data from the SPI/Master 11 or the SPI_Slave to be transmitted and received by the TDD method at the unchanged timing. Hereinafter, a configuration of the communication system 2 in FIG. 1 will be described in detail. As illustrated in FIG. 4, the SPI/Master 11 in FIG. 1 includes a controller 11-3 and an SCK generator 11-4 in addition to the shift register 11-1 and the buffer/memory 11-2.

The controller 11-3 supplies a slave select signal (CS signal) for activating the SPI communication to the M_SerDes 31 through an M_CSn pin. The CS signals are provided as many as the number of devices that perform the SPI communication with the SPI/Master 11. For example, in FIG. 1, different M_CSn pins are respectively assigned to the M_SerDes 31, the S_SerDes 41, and the SPI/Slave 12. In the present specification, the pin that outputs the CS signal output from the SPI/Master 11 may be referred to as M_CSn(x). For example, M_CSn(0) is assigned to the M_SerDes 31, and M_CSn(1) is assigned to the SPI/Slave 12.

The controller 11-3 controls an operation of the SCK generator 11-4. The SCK generator 11-4 outputs the SCK when any CS signal is in the active state. The shift register 11-1 performs a shift operation in synchronization with the SCK.

The controller 11-3 detects that the SPI/Slave 12 has output an interrupt signal S_INT by an interrupt signal M_INT from the M_SerDes 31, and starts the SPI communication of the next frame with the interrupt signal M_INT as a trigger. Alternatively, in a case where the controller 11-3 itself wants to transmit the SPI data, the controller 11-3 similarly starts the SPI communication (time t5 of the M_CSn(1) in FIG. 6 to be described below).

The M_SerDes 31 is connected to the SPI/Master 11. The M_SerDes 31 includes an SPI block 31-1 in order to perform data communication with the SPI/Master 11 according to the SPI protocol. The SPI block 31-1 includes a shift register 31-1-1 and a buffer/memory 31-1-2. When the controller 11-3 in the SPI/Master 11 activates the CS signal corresponding to the M_SerDes 31 and an SCK generator 41-1-3 outputs the SCK, the shift register 31-1-1 outputs the SPI data in synchronization with the SCK and supplies the SPI data to the SPI/Master 11 via the MISO pin. Furthermore, the shift register 31-1-1 fetches the SPI data output from the SPI/Master 11 via the MOSI pin in synchronization with the SCK.

When the CS signal enters the idle state, the controller 11-3 causes the SCK generator 11-4 to stop the output of the SCK. As a result, the shift register 31-1-1 holds the state immediately before the SCK is stopped.

When the CS signal transitions to the idle state, the SPI block 31-1 in the M_SerDes 31 transfers all the data in the shift register 31-1-1 to the buffer/memory 31-1-2.

As a result, data transfer processing by the SPI protocol from the SPI/Master 11 to the M_SerDes 31 ends.

Note that the data transfer from the shift register 31-1-1 in the M_SerDes 31 to the buffer/memory 31-1-2 depends on the amount of data that the SPI/Master 11 wants to transfer and the data capacity of the shift register 31-1-1. Therefore, in a case where there is a possibility that the data in the shift register 31-1-1 overflows while the CS signal is in the active state, data omission can be prevented by transferring the data in the shift register 31-1-1 to the buffer/memory 31-1-2 before the overflowing.

In addition, the M_SerDes 31 includes a packet encoder (ECP) 31-2, a packet decoder (DCP) 31-3, a DLL 31-4, and a PHY layer block (PHY) 31-5. The ECP 31-2 in the M_SerDes 31 converts the SPI data stored in the buffer/memory 31-1-2 into a packet (SPI packet) conforming to the TDD method. The DLL 31-4 combines the SPI packet generated by the ECP 31-2 with other transmission packets other than the SPI packet to generate an UP Link packet. The PHY 31-5 transmits the UP Link packet to the S_SerDes 41 via the UP Link.

The S_SerDes 41 in FIG. 1 is connected to the SPI/Slave 12. The S_SerDes 41 includes an SPI block 41-1 in order to transmit and receive data to and from the SPI/Slave 12 according to the SPI protocol. The SPI block 41-1 includes a controller (CNTR) 41-1-4, an SCK generator 41-1-3, a shift register 41-1-1, and a buffer/memory 41-1-2. The controller 41-1-4 controls the timing and frequency of the SCK output from the SCK generator 41-1-3 on the basis of the SPI control information from the SPI/Master 11. When the controller 41-1-4 activates the CS signal corresponding to SPI/Slave 12 and the SCK generator 41-1-3 outputs the SCK, the shift register 41-1-1 outputs the SPI data in synchronization with the SCK and supplies the SPI data to the SPI/Slave 12 via the S_MOSI pin. Furthermore, the SPI data output from the SPI/Slave 12 via the S_MISO pin is input to the shift register 41-1-1 in synchronization with the SCK. In addition, the S_SerDes 41 includes a packet encoder (ECP) 41-2, a packet decoder (DCP) 41-3, a DLL 41-4, and a PHY layer block (PHY) 41-5. The ECP 41-2 in the S_SerDes 41 converts the SPI data stored in the buffer/memory 41-1-2 into a packet (SPI packet) conforming to the TDD method. The DLL 41-4 combines the SPI packet generated by the ECP 41-2 with other transmission packets other than the SPI packet to generate an UP Link packet. The PHY 41-5 transmits the UP Link packet to the S_SerDes 41 via the UP Link.

FIG. 5 is a diagram for describing information included in the transmission packet generated by the ECPs 31-2 and 41-2. In FIG. 5, an identification symbol, an information name, a function in a transmission packet for performing data transmission from the SPI/Master 11 to the SPI/Slave 12, a function in a transmission packet for performing data transmission from the SPI/Slave 12 to the SPI/Master 11, and description are associated with one another for each piece of information in the transmission packet.

C-1 is a transmission mode and is commanded by the SPI/Master 11 as a command. The transmission mode included in the packet from the SPI/Slave 12 is used by the SPI/Master 11 to monitor the state. When C-1 is 0, a batch of data blocks is transmitted within one frame period of TDD. When C-1 is 1, a plurality of data blocks divided according to a plurality of frame periods is transmitted.

C-2 is a slave selector signal (CSn signal) and is commanded by the SPI/Master 11 as a command. The CSn signal included in the packet from the SPI/Slave 12 is used by the SPI/Master 11 to monitor the state. The CSn signal is a signal for selecting the SPI/Slave 12 that the SPI/Master 11 wants to communicate with. The CSn signal can select not only an individual SPI/Slave 12 but also the SerDes (M_SerDes 31 or S_SerDes 41).

C-3 is an SCK frequency and is commanded by the SPI/Master 11 as a command. The SCK frequency included in the packet from the SPI/Slave 12 is used by the SPI/Master 11 to monitor the state. In C-3, the SPI/Master 11 designates the SCK frequency on the SPI/Slave 12 side.

Figure 3A:
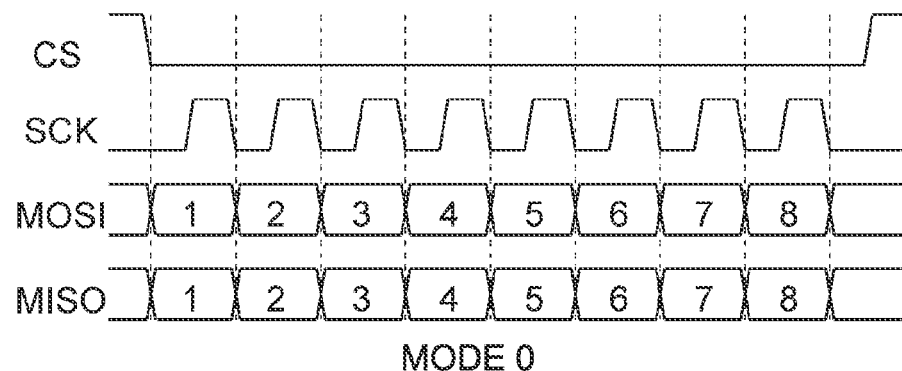
FIGS. 3A-D are basic signal waveform diagrams of an SPI protocol.
Figure 3B:
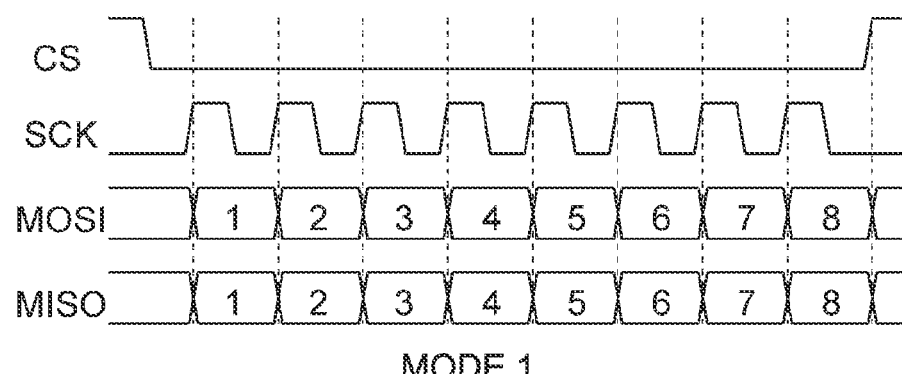
Figure 3C:
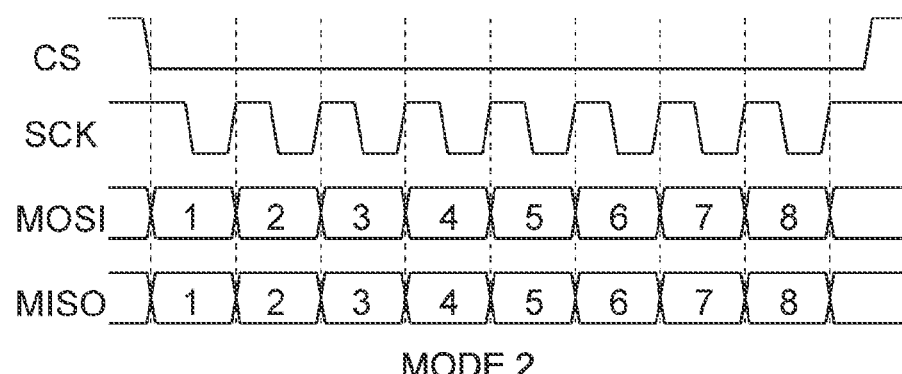
Figure 3D:
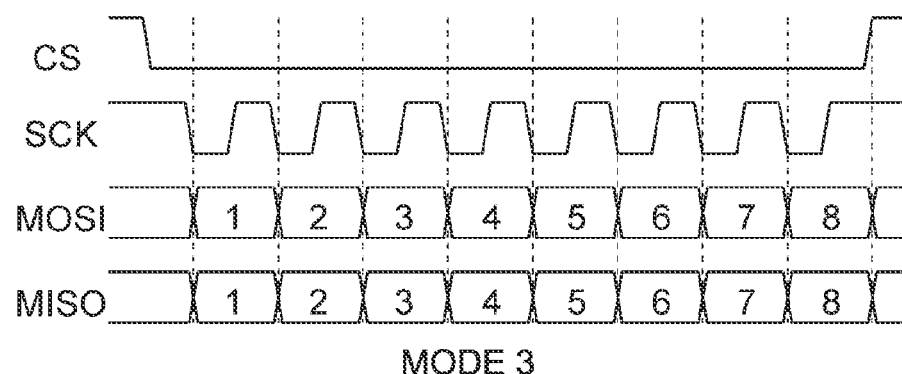

C-4 is an SPI mode and is commanded by the SPI/Master 11 as a command. The SPI mode included in the packet from the SPI/Slave 12 is used by the SPI/Master 11 to monitor the state. For example, when C-4 is 0, the mode=0 in FIG. 3A is selected, when C-4 is 1, the mode=1 in FIG. 3B is selected, when C-4 is 2, the mode=2 in FIG. 3C is selected, and when C-4 is 3, the mode=3 in FIG. 3D is selected.

C-5 is a total number of data blocks DB and is provided as information by the SPI/Master 11. The total number of DBs included in the packet from the SPI/Slave 12 is used by the SPI/Master 11 to monitor the state. When C-1 is 0 (at the time of transmission of the divided DB), C-5 is 1. The SPI/Slave 12 returns the number of received DBs since the SPI communication was started.

C-6 is a current position of the data block DB and is provided as information by the SPI/Master 11. C-6 is not included in the packet from the SPI/Slave 12. When C-6 is 0, it indicates that the information is invalid. When C-1 is 0, C-6 is 0. When C-6 is 1, the data is head divided data. When C-6 is 2, the data is divided data other than the head and last divided data. When C-6 is 3, the data is the last divided data.

C-7 is a current state of the data block DB and is provided as information by both the SPI/Master 11 and the SPI/Slave 12. When C-7 is 0, the data is dummy data, and when C-7 is 1, the data is valid data.

C-8 is a size of the data block DB and is provided as information by the SPI/Master 11. The data transmission size included in the packet from the SPI/Slave 12 is used by the SPI/Master 11 to monitor the state. C-8 represents the data transmission size in byte units, and the maximum size is 511 bytes.

C-9 is interrupt information of the SPI/Slave 12 and is an interrupt flag not included in the packet transmitted by the SPI/Master 11 but included in the packet transmitted by the SPI/Slave 12. When C-9 is 0, the data indicates that there is no interrupt, and when C is 1, the data indicates that there is an interrupt.

C-10 is an operation state on the SPI/Slave 12 side and is not included in the packet transmitted by the SPI/Master 11 but included in the packet from the SPI/Slave 12. When C-10 is 0, the data indicates a normal state, when C-10 is 1, the data indicates busy (the DCP 31-3 is not empty), and when C-10 is 2, the data indicates that an error has occurred (SPI data has been broken).

C-11 is a reset of the SPI block 41-1 and is commanded by the SPI/Master 11 as a command. C-11 is not included in the packet of the SPI/Slave 12. When C-11 is 0, the reset is not performed, and when C-11 is 1, the SPI block 41-1 of the S_SerDes 41 is reset.

D-1 represents the SPI data transmitted together with the above-described C-1 to C-11, the SPI data transmitted by the SPI/Master 11 is output through the M_MOSI pin, and the SPI data transmitted by the SPI/Slave 12 is output through the S_MISO pin.

E-1 is CRC transmitted together with the above-described C-1 to C-11 and D-1, and is included in both the SPI data transmitted from the SPI/Master 11 and the SPI data transmitted from the SPI/Slave 12. The CRC is used for error detection of the control data C-1 to C-11 and the SPI data.

Figure 6:
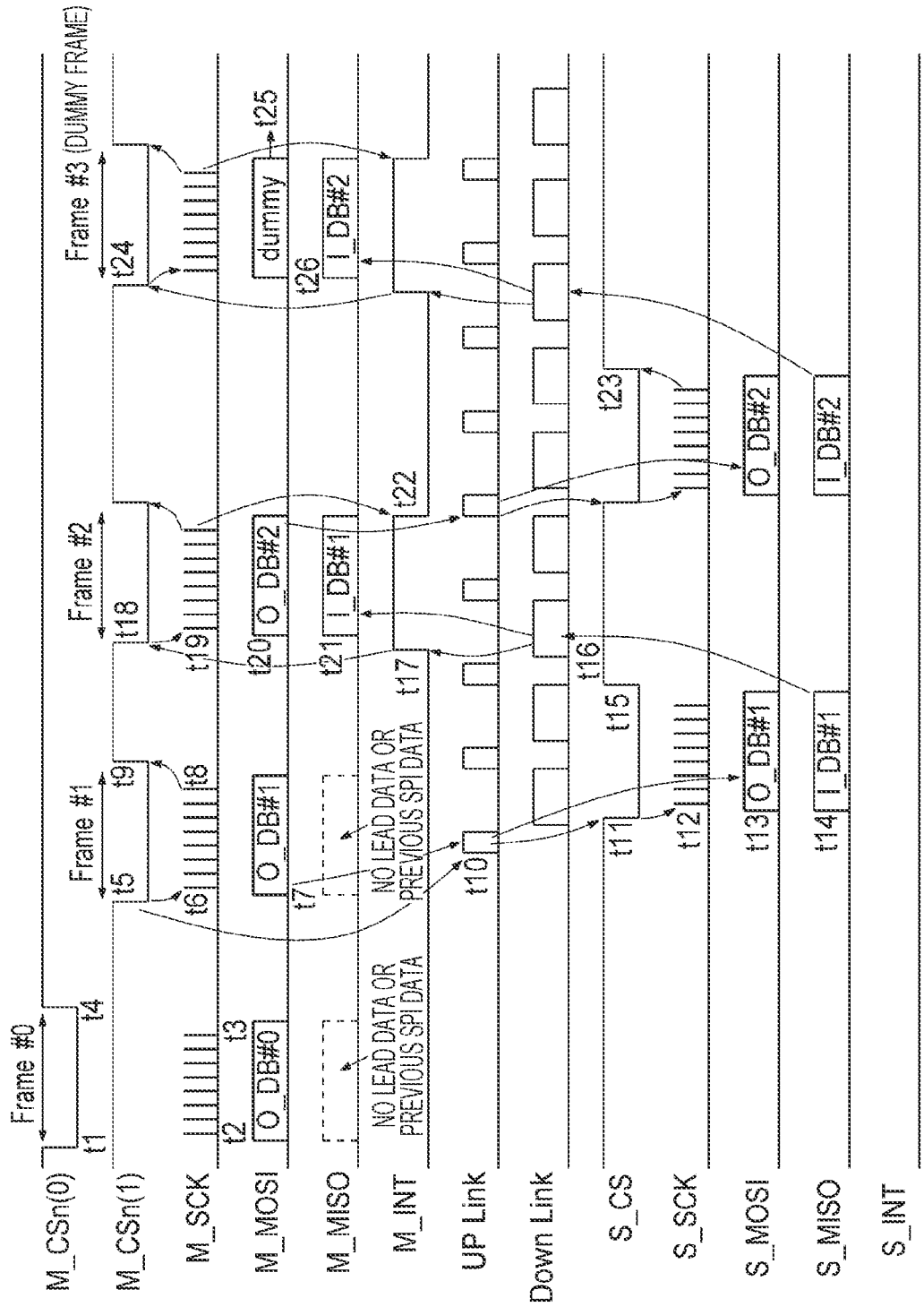
FIG. 6 is a timing chart of communication between an SPI/Master and an SPI/Slave.
Figure 7A:
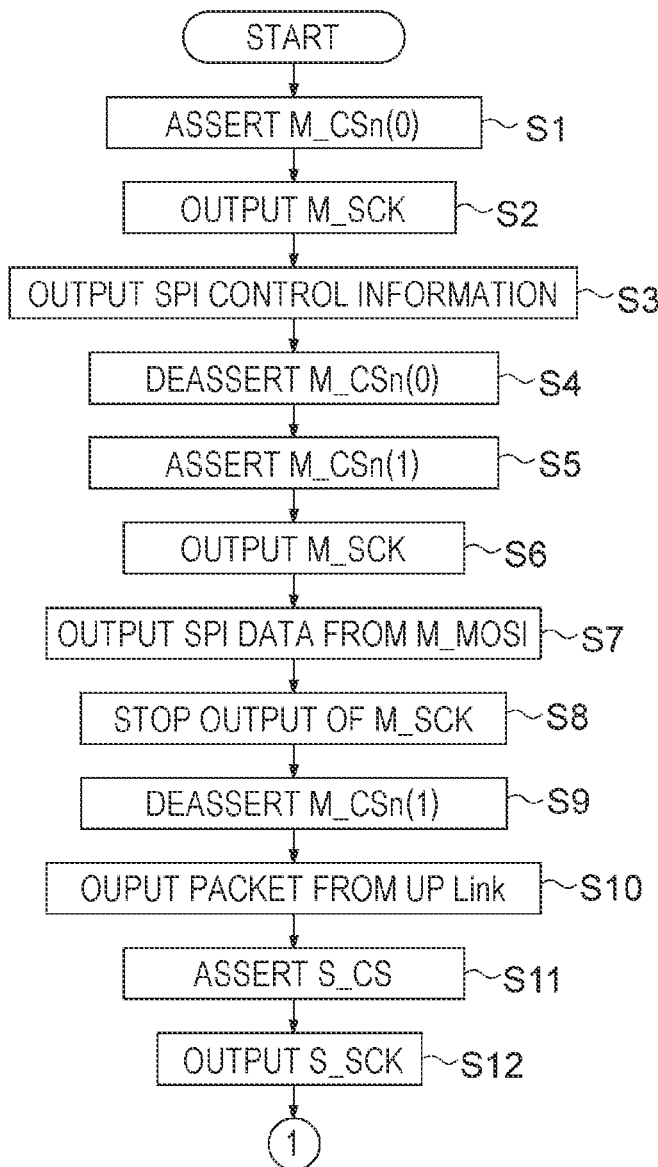
FIG. 7A is a flowchart illustrating a processing procedure in which the SPI/Master communicates with the SPI/Slave.
Figure 7B:
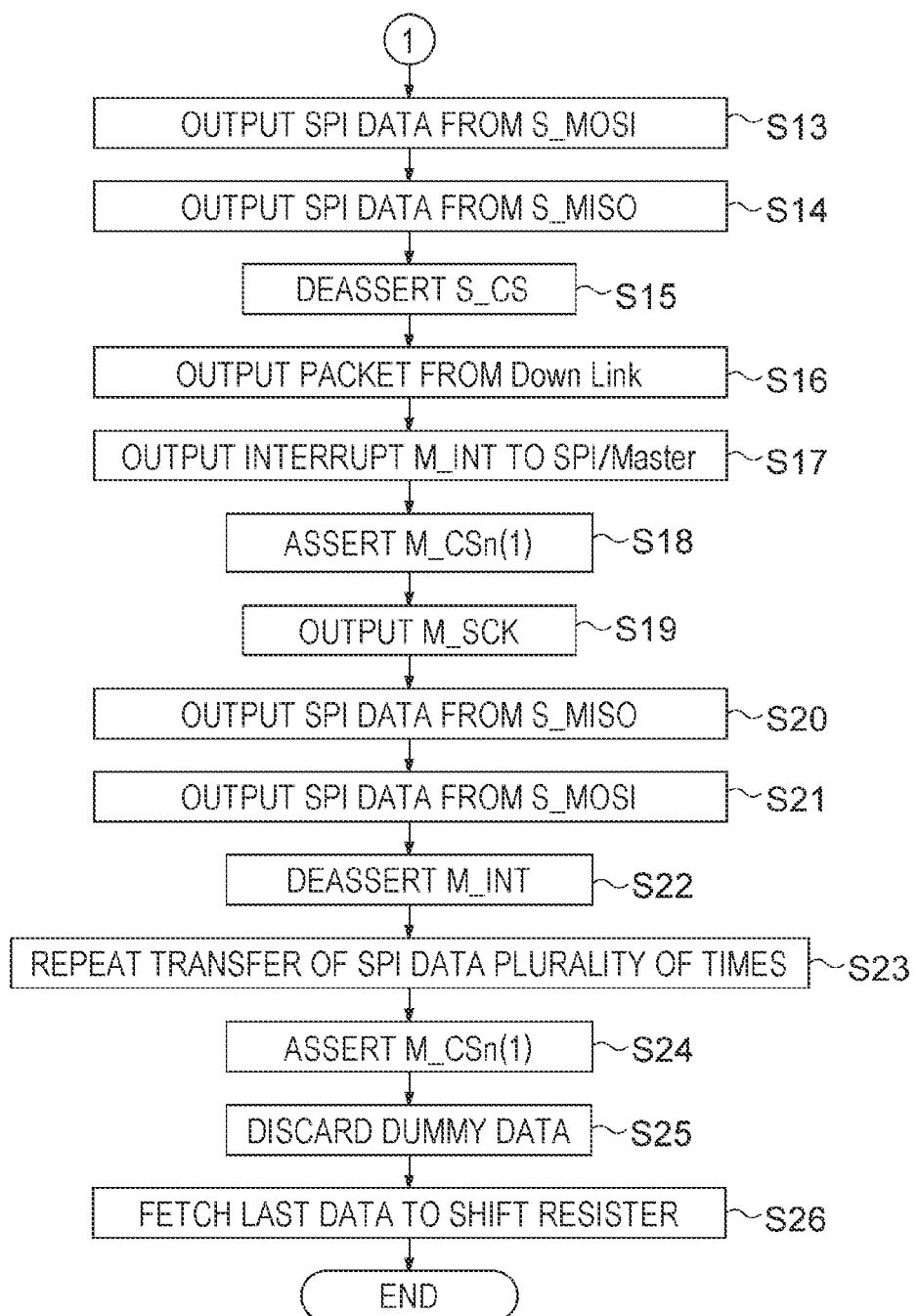
FIG. 7B is a flowchart following FIG. 7A.
Figure 8:
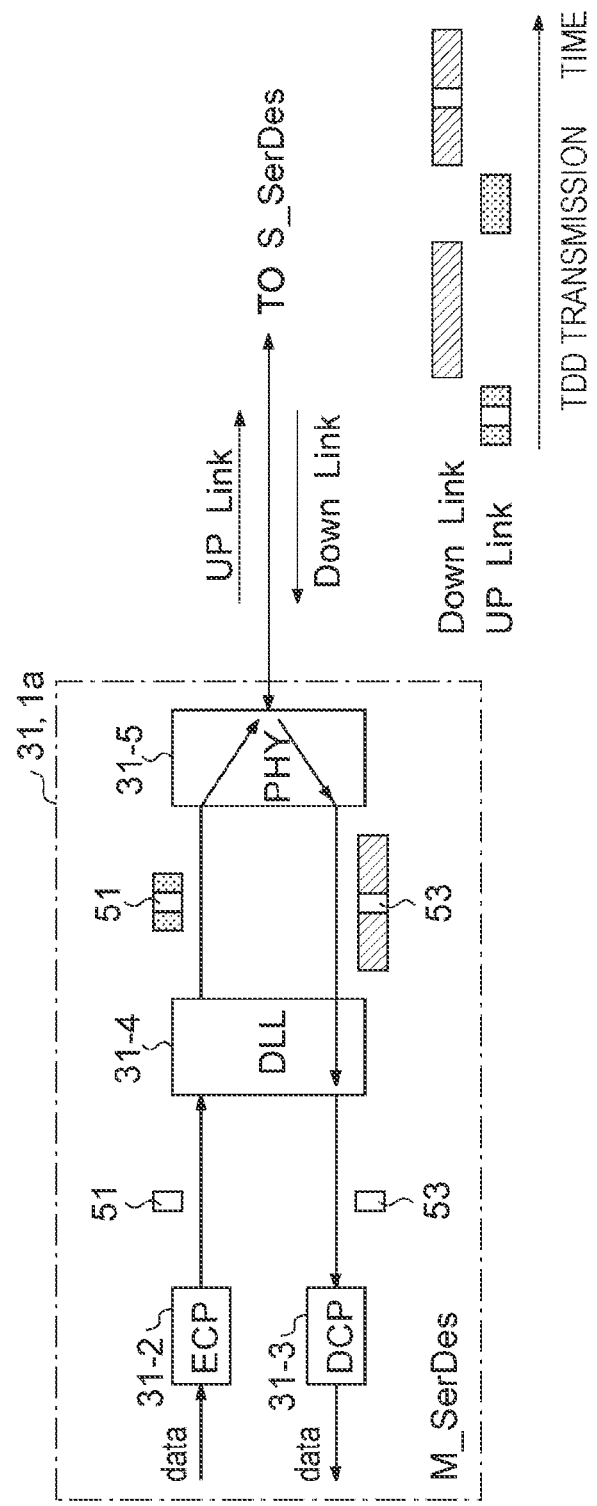
FIG. 8 is a diagram schematically illustrating a packet transmitted and received by UP Link and Down Link.

FIG. 6 is a timing chart in which the SPI/Master 11 communicates with the SPI/Slave 12, and FIGS. 7A and 7B are flowcharts illustrating a processing procedure in which the SPI/Master 11 communicates with the SPI/Slave 12. FIG. 8 is a diagram schematically illustrating packets transmitted and received by UP Link and Down Link. FIGS. 6 to 8 illustrate a processing procedure of transmitting and receiving a batch of data blocks in one frame period of TDD.

First, the SPI/Master 11 performs processing of generating the SPI control information to be used by the ECP 31-2 and the DCP 31-3 in the M_SerDes 31 and transmitting the SPI control information to the M_SerDes 31 (steps S1 to S4 and time t1 to t4). The SPI control information includes, for example, an SPI transmission mode, SCK frequency information, an SPI mode, and the size and number of data blocks DB during SPI communication. The SPI/Master 11 stores the SPI control information in the buffer/memory 11-2 in advance.

The controller 11-3 in the SPI/Master 11 (asserts) the M_CSn(0) to the active state (Low) in order to perform the SPI communication with the M_SerDes 31 (step S1 and time t1).

The controller 11-3 in the SPI/Master 11 controls the SCK generator 11-4 to output the clock M_SCK (step S2 and time t2). The SPI control information stored in the buffer/memory 11-2 is sequentially read and transferred to the shift register 11-1 in synchronization with the clock M_SCK. The SPI control information to be transferred includes the transmission mode, the SCK frequency information, the SPI mode, the transmission data size, the number of data blocks, and the like. The shift register 11-1 sequentially outputs the SPI control information in synchronization with the clock M_SCK (steps S2 to S3 and time t2 to t3). This SPI control information is input to the M_SerDes 31 via the M_MOSI pin. The shift register 31-1-1 in the M_SerDes 31 fetches the SPI control information from the SPI/Master 11 in synchronization with the M_SCK.

The shift register 31-1-1 transmits the data held in the shift register 31-1-1 to the SPI/Master 11 via the M_MISO pin in synchronization with M_SCK in parallel with fetching the SPI control information from the SPI/Master 11. Since this data is invalid data, the data is indicated by a broken line at time t2 to t3 in FIG. 6. The SPI/Master 11 discards this data after reception. When the data transfer of the SPI/Master 11 is completed, the controller 11-3 in the SPI/Master 11 causes the SCK generator 11-4 to stop generation of the M_SCK and deasserts M_CSn(0) to the idle state (step S4 and time t4). When the M_SCK stops, the shift register 31-1-1 in the M_SerDes 31 transfers the held SPI control information from the SPI/Master 11 to the buffer/memory 31-1-2.

The buffer/memory 31-1-2 in the M_SerDes 31 transfers the SPI control information from the SPI/Master 11 to the ECP 31-2. The ECP 31-2 converts the SPI control information into an SPI packet.

Next, the SPI/Master 11 transmits the SPI data to the M_SerDes 31 for the purpose of data transmission to the SPI/Slave 12. Specifically, the controller 11-3 in the SPI/Master 11 transitions (asserts) M_CSn(1) corresponding to the SPI/Slave 12 from the idle state to the active state (step S5 and time t5).

Furthermore, the controller 11-3 also causes the SCK generator 11-4 to output the M_SCK (step S6 and time t6). The buffer/memory 11-2 reads the data to be transmitted to the SPI/Slave 12 by the transmission data size and inputs the data to the shift register 11-1. The shift register 11-1 sequentially outputs data for the SPI/Slave 12 via the M_MOSI pin in synchronization with the M_SCK (step S7 and time t7).

The shift register 31-1-1 in the M_SerDes 31 sequentially fetches the data output from the SPI/Master 11 into the shift register 31-1-1 in synchronization with the SCK. When the data transfer corresponding to the transmission data size is completed, the controller 11-3 in the SPI/Master 11 causes the SCK generator 11-4 to stop output of the M_SCK (step S8 and time t8). Thereafter, the controller 11-3 of the SPI/Master 11 sets M_CSn(1) to the idle state (deassert) and terminates the SPI communication (step S9 and time t9).

When the M_SCK stops, the M_SerDes 31 transfers the data held in the shift register 31-1-1 to the buffer/memory 31-1-2. The buffer/memory 31-1-2 transfers the data transferred from the shift register 31-1-1 to the ECP 31-2. The ECP 31-2 generates data including the SPI control information received in the communication from time t1 to t3, the CS signal (M_CSn(1)) corresponding to the SPI/Slave 12, and the data for the SPI/Slave 12. The ECP 31-2 adds a flag indicating that the packet is valid to the generated data to generate a transmission packet.

The ECP 31-2 transmits the generated transmission packet to the DLL 31-4 as an SPI packet 51 as illustrated in FIG. 8. The DLL 31-4 generates an UP Link packet 52 by combining the SPI packet 51 from the ECP 31-2 and other transmission packets, and outputs the UP Link packet 52 to the PHY layer block 31-5. The PHY layer block 31-5 outputs the received UP Link packet 52 to the cable 103 according to UP Link output timing by the TDD (step S10 and time t10).

The S_SerDes 41 communicates with the M_SerDes 31 by the TDD method and also performs the SPI communication with the SPI/Slave 12. The PHY layer block 41-5 in the S_SerDes 41 receives the UP Link packet from the M_SerDes 31 via the cable 103 and outputs the UP Link packet to the link layer block (DLL) 41-4.

The link layer block 41-4 in S_SerDes 41 extracts the SPI packet including the SPI data from the UP Link packet and outputs the SPI packet to a packet decoder (DCP) 41-3.

The DCP 41-3 detects that the SPI/Slave 12 is an SPI communication target on the basis of the CSn information (C-2) in the received SPI packet. Then, to start the SPI communication with the SPI/Slave 12, the controller 41-1-4 detects that all of the SPI data has been transmitted from the transmission mode information (C-1) in the SPI packet, acquires the number of SCK cycles for one SPI communication from the number of SPI data (C-5) and the size of the SPI data (C-8), and then sets (asserts) a Slave select signal S_CS to the active state (step S11 and time t11).

Next, the controller 41-1-4 in the S_SerDes 41 acquires the SCK frequency information (C-3) included in the SPI packet, and causes the SCK generator 41-1-3 to output the S_SCK at the acquired frequency (step S12 and time t12).

At this time, the phase relationship between S_CS and SCK follows the SPI mode (C-4) in the SPI packet. This allows the S_SerDes 41 to transfer the SPI data to the SPI/Slave 12. The data transferred to the SPI/Slave 12 is the SPI packet (D-1) and is stored in the buffer/memory 41-1-2.

The shift register 41-1-1 in the S_SerDes 41 sequentially outputs the SPI data transferred from the buffer/memory 41-1-2 through the S_MOSI pin by the SCK supplied from the SCK generator 41-1-3 (step S13 and time t13). In parallel with the step, the SPI data output from the SPI/Slave 12 through the S_MISO pin is stored in the shift register 41-1-1 and then transferred to the buffer/memory 41-1-2 as appropriate.

The SPI/Slave 12 sequentially fetches the SPI data through the S_MOSI pin of the S_SerDes 41 into the shift register 12-1 in synchronization with the S_SCK and sequentially outputs the data held by the shift register 12-1 through the S_MISO pin (step S14 and time t14).

When the controller (41-1-4) drives the S_SCK by the set SPI data size (C-8), the controller stops the SCK and returns (deasserts) the S_CS to the idle state in order to terminate the SPI communication (step S15 and time t15). In parallel with the step, the SPI/Slave 12 transfers the SPI data from the S_MOSI pin from the shift register 12-1 to the buffer/memory 12-2 as appropriate while receiving the SPI data through the S_MOSI pin of the S_SerDes 41, so that the data reception from the SPI/Master 11 is finally completed.

The buffer/memory 41-1-2 transfers the SPI data received from the SPI/Slave 12 to the packet encoder (ECP) 41-2 for transmission to the SPI/Master 11. The ECP 41-2 adds the SPI control information obtained in the SPI packet to the SPI packet 53 together with the received SPI data. Furthermore, the ECP 41-2 adds the information indicating the operation state of the SPI/Slave 12 in (C-10) of FIG. 5 and the CRC in (E-1) to the SPI packet.

When the SPI/Slave 12 outputs the interrupt signal (C-9), the ECP 41-2 also includes information of the interrupt signal in the SPI packet 53. In this case, the SPI packet 53 does not transmit the SPI data from the SPI/Slave 12. The reason for providing the interrupt signal is that, in the SPI protocol, only the SPI/Master 11 controls the CS signal and the SCK, and it is difficult for the SPI/Slave 12 to actively output data, so the interrupt signal is issued to wait for an instruction from the SPI/Master 11.

The link layer block (DLL) 41-4 combines the SPI packet 53 received from the ECP41-2 with other transmission packets to generate a Down Link packet 54, and outputs the Down Link packet 54 to the PHY layer block 41-5. The PHY layer block 41-5 outputs the received Down Link packet 54 to the cable 103 according to the Down Link output timing (step S16 and time t16).

The PHY layer block 31-5 of M_SerDes 31 receives the Down Link packet including the SPI packet 53 from SPI/Slave 12 output from the S_SerDes 41, and outputs the Down Link packet to the DLL 31-4. The DLL 31-4 extracts the SPI packet 53 from the received Down Link packet 54 and outputs the SPI packet 53 to the packet decoder (DCP) 31-3.

The DCP 31-3 in the M_SerDes 31 receives a packet including I_DB #1 simultaneously transmitted to the Master 11 when receiving SPI data O_DB #1 from the Master 11, and stores the packet in the buffer/memory 31-1-2.

To indicate that the valid SPI data I_DB #1 has been returned from the SPI/Slave 12, the buffer/memory 31-1-2 asserts the interrupt signal M_INT (step S17 and time t17). The controller 11-3 of the SPI/Master 11 that has received the interrupt signal M_INT starts the SPI communication in order to read the SPI data from the SPI/Slave 12 from M_SerDes 31, and activates (asserts) the M_CSn(1) (step S18 and time t18).

The controller 11-3 of the SPI/Master 11 controls the SCK generator 11-4 to output the M_SCK (11-10-2) (step S19 and time t19). The shift register 11-1 sequentially fetches data from the M_MISO pin by the transmission data size (C-8) set in Frame #1 in synchronization with the SCK. At this time, the buffer/memory 31-1-2 in the M_SerDes 31 transfers the data from the SPI/Slave 12 to the shift register 31-1-1 at appropriate time, and the shift register 31-1-1 sequentially outputs the data in synchronization with the SCK generator 11-4 as described above. This data is fetched through the M_MISO pin (step S20 and time t20). In parallel with the step, the SPI/Master 11 reads the SPI data to be next transferred to the SPI/Slave 12 from the buffer/memory 11-2, fetches the SPI data into the shift register 11-1, and sequentially outputs the SPI data from the shift register 11-1 through the M_MOSI pin (step S21 and time t21).

After necessary data is read, the buffer/memory 31-1-2 returns (deasserts) the interrupt signal M_INT to the idle state (step S22 and time t22).

With the above operation, the transfer of the SPI data between the SPI/Master 11 and the SPI/Slave 12 is completed. The above series of operations is repeated as many times as a necessary number of transfers of the SPI data (step S23 and time t23).

When the SPI/Master 11 reads the last SPI data from the SPI/Slave 12, the SPI/Master 11 asserts the M_CSn(1) in order to output dummy data (step S24 and time t24). Since the dummy data is invalid data and does not need to be transferred to the SPI slave, the dummy data is discarded without being transferred from the shift register 31-1-1 of the M_SerDes 31 to the buffer/memory 31-1-2 (step S25 and time t25). The last data from the SPI/Slave 12 is output from the shift register 31-1-1 in the M_SerDes 31 through the M_MISO pin, and fetched into the shift register 11-1 in the SPI/Master 11 (step S26 and time t26).

As described above, in the first embodiment, a batch of data transmitted from the SPI/Master 11 to the M_SerDes 31 by SPI communication can be transmitted to the S_SerDes 41 through the UP Link, and a batch of data transmitted from SPI/Slave 12 to the S_SerDes 41 by the SPI communication can be transmitted to the M_SerDes 31 through the Down Link, within one frame period of the TDD method. Thus, the serial communication can be performed between the SPI/Master 11 and the SPI/Slave 12 via the M_SerDes 31 and the S_SerDes 41 by combining the SPI communication of the full-duplex communication method and the TDD communication of the half-duplex communication method.

Second Embodiment

In a second embodiment, data transmitted and received through SPI communication is divided into a plurality of frame periods of a TDD method and transmitted and received.

A communication system 2 according to the second embodiment is configured similarly to FIG. 1 but differs in SPI control information transmitted from an SPI/Master 11 to an M_SerDes 31.

Figure 10A:
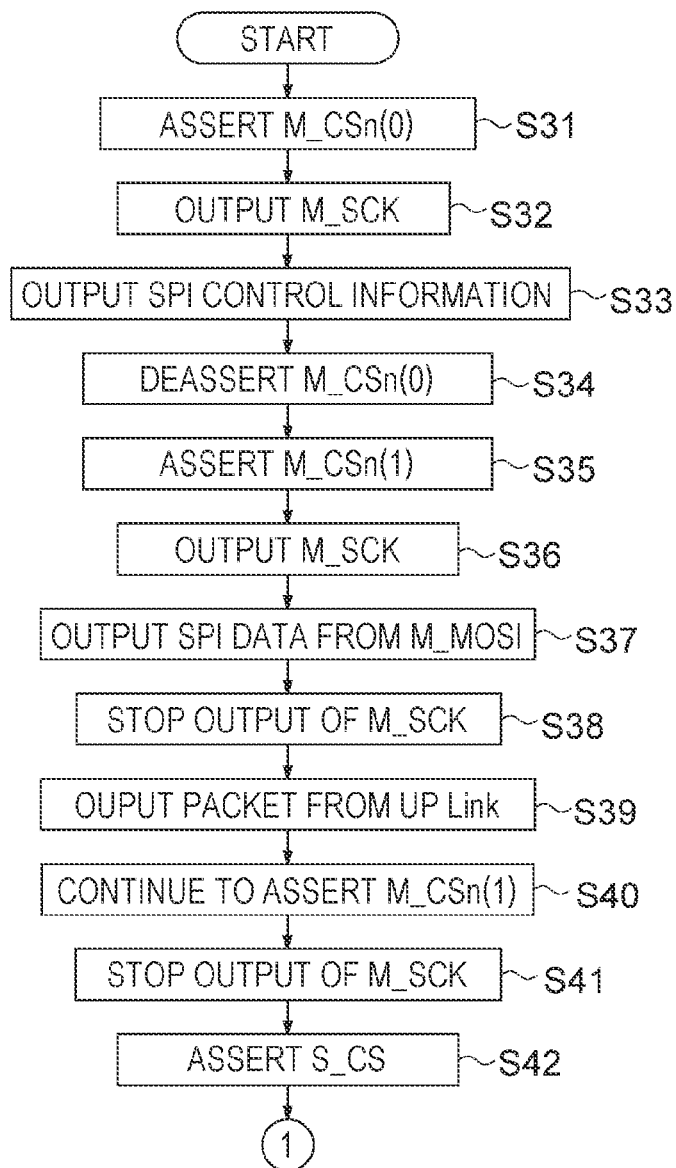
FIG. 10A is a flowchart illustrating a processing procedure of a communication system that operates at the timing of FIG. 9.
Figure 10B:
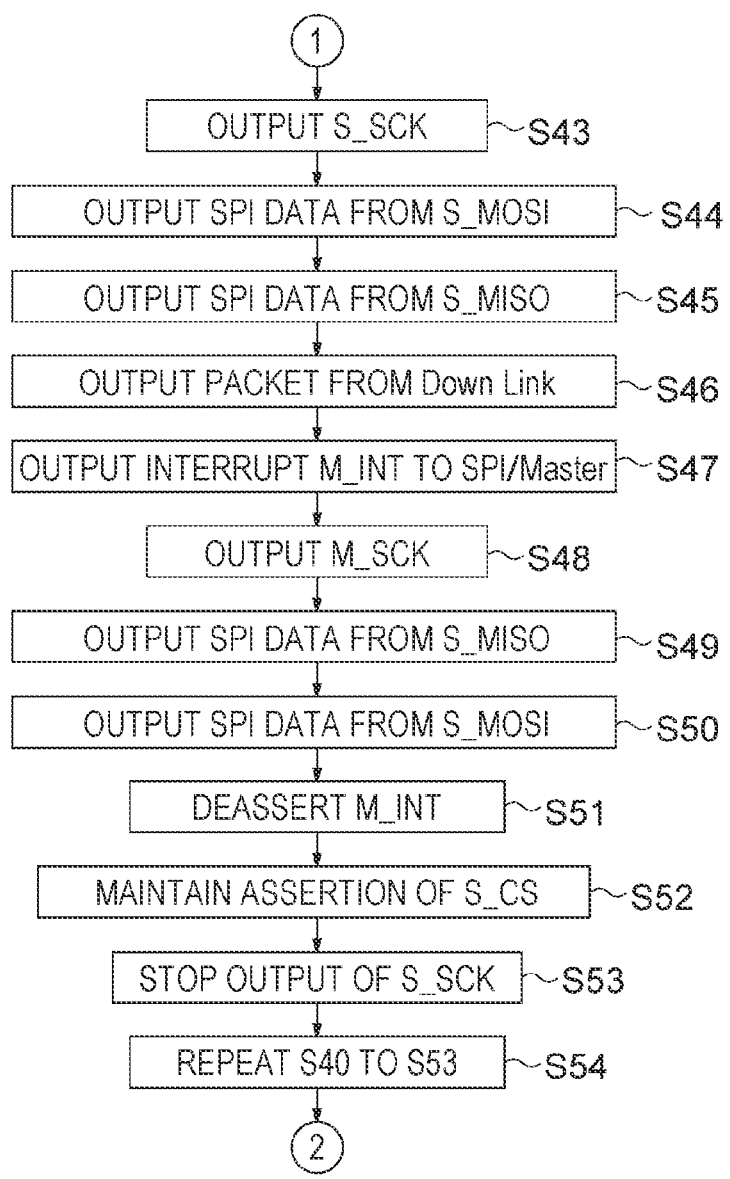
FIG. 10B is a flowchart following FIG. 10A.
Figure 10C:
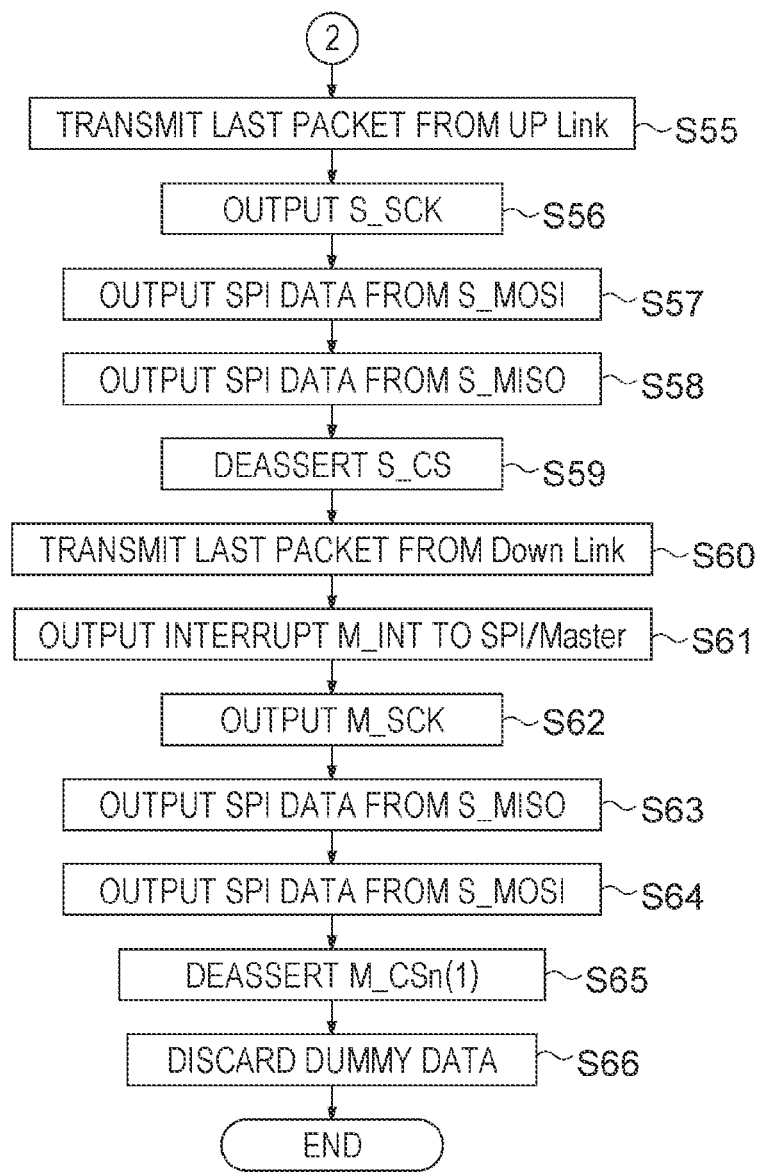
FIG. 10C is a flowchart following FIG. 10B.

FIG. 9 is a timing chart in a case of repeating processing of transmitting divided data within one frame period over a plurality of frames. FIGS. 10A, 10B, and 10C are flowcharts illustrating a processing procedure of the communication system 2 that operates at timing of FIG. 9.

Steps S31 to S38 (time t31 to t38) in FIG. 10A are similar to steps S1 to S8 (times t1 to t8) in FIG. 7A, and the SPI/Master 11 generates SPI control information and sets the SPI control information in an ECP 31-2 and a DCP 31-3 in the M_SerDes 31. A processing operation in and after step S39 is basically similar to that in FIGS. 7A and 7B, but in FIGS. 9, 10A, 10B, and 10C, data transmitted in one SPI frame is divided into a plurality of pieces, and each of the plurality of divided data is transmitted in one frame period of TDD. A signal transmitted in one frame period of TDD is referred to as a TDD burst signal.

Until transfer of all the divided data in the SPI frame is completed, a Slave Select signal M_CSn(1) between the SPI/Master 11 and the M_SerDes 31 and a Slave Select signal S_CS between the S_SerDes 41 and an SPI/Slave 12 continue to be in an active state.

The SPI/Master 11 asserts a CS signal (M_CSn(1)) in order to start transmission of SPI data (step S35 and time t35). The SPI/Master 11 causes an SCK generator 11-4 to output M_SCK for the purpose of transmitting one piece of divided data (data block DB) (step S36 and time t36).

Next, the SPI/Master 11 sequentially outputs SPI data from a shift register 11-1 in synchronization with the SCK, and outputs the SPI data through an M_MOSI pin (step S37 and time t37). Furthermore, the SPI/Master 11 outputs the CS signal corresponding to the SPI/Slave 12 as a communication target to the M_SerDes 31 (step S38 and time t38). Next, the ECP 31-2 in the M_SerDes 31 generates a packet including the SPI data and the CS signal (step S39 and time t39). This packet is combined with other transmission packets in a PHY layer block 31-5 to generate an UP Link packet. The UP Link packet is transmitted to the S_SerDes 41 via an UP Link.

The SPI/Master 11 continues to assert the CS signal until all the divided data are transmitted (step S40 and time t40). The SPI/Master 11 stops output of the M_SCK from the SCK generator 11-4 until the next divided data is transmitted (step S41 and time t41).

The S_SerDes 41 acquires the CS signal and the SPI data from the received packet and asserts the S_CS (step S42 and time t42). A controller 41-1-4 in the S_SerDes 41 causes an SCK generator 41-1-3 to output S_SCK (step S43 and time t43). After temporarily storing the SPI data in the received packet in a buffer/memory 41-1-2, the S_SerDes 41 transfers the SPI data to a shift register 41-1-1. The shift register 41-1-1 sequentially outputs data in synchronization with the S_SCK. The output data is input through an S_MOSI pin to the SPI/Slave 12 (step S44 and time t44). Furthermore, data output from a shift register 12-1 in the SPI/Slave 12 in synchronization with S_SCK is input to the S_SerDes 41 through S_MISO pin (step S45 and time t45).

A DLL 41-4 in the S_SerDes 41 generates a transmission packet including the data from the S_MISO pin. A PHY layer block 41-5 transmits the transmission packet to the Down Link at timing specified by the TDD method (step S46 and time t46).

A DLL 31-4 in the M_SerDes 31 transmits an SPI packet included in the transmission packet transmitted from the S_SerDes 41 to the DCP 31-3. The DCP 31-3 receives a packet including I_DB #1 simultaneously transmitted to the Master 11 when receiving SPI data O_DB #1 from the Master 11, and stores the packet in a buffer/memory 31-1-2.

To indicate that the valid SPI data I_DB #1 has been returned from the SPI/Slave 12, the buffer/memory 31-1-2 asserts an interrupt signal M_INT (step S47 and time t47).

When detecting that the M_INT has been asserted, the SPI/Master 11 causes the SCK generator 11-4 to output the M_SCK (step S48 and time t48). A buffer/memory 11-2 transfers data to be next transmitted to the shift register 11-1, and the shift register 11-1 outputs the SPI data through the M_MOSI pin in synchronization with the M_SCK (step S49 and time t49). In parallel with the step, the data output from the M_SerDes 31 via the M_MISO pin is fetched into the shift register 11-1 (step S50 and time t50) After reading all the data from the M_SerDes 31, the SPI/Master 11 returns (deasserts) the M_INT to the idle state (step S51 and time t51).

The S_SerDes 41 maintains the active state (assertion) of the S_CS until all the divided data is transmitted (step S52 and time t52). The SCK generator 41-1-3 in the S_SerDes 41 stops output of the S_SCK until the next SPI data is transmitted from the M_SerDes 31 (step S53 and time t53).

Thereafter, processing operations in steps S40 to S53 are repeated (step S54 and time t54). When the M_SerDes 31 transmits the last divided packet by the UP Link (step S55 and time t55), the S_SerDes 41 outputs the S_SCK (step S56 and time t56). Then, the S_SerDes 41 outputs the SPI data via the S_MOSI pin (step S57 and time t57) and receives the last SPI data from the SPI/Slave 12 via the S_MISO pin (step S58 and time t58).

When receiving the last SPI data, the S_SerDes 41 sets (deasserts) the S_CS to the idle state (step S59 and time t59). Furthermore, the S_SerDes 41 transmits a transmission packet including the last SPI data to the M_SerDes 31 by Down Link (step S60 and time t60).

The M_SerDes 31 activates the M_INT as in step S47 (step S61 and time t61). Furthermore, the M_SerDes 31 causes the SCK generator 11-4 in the SPI/Master 11 to output the M_SCK (step S62 and time 62). Data output from a shift register 31-1-1 via the M_MISO pin is fetched into the shift register 11-1 in the SPI/Master 11 in synchronization with the M_SCK (steps S63 to S64 and time t63 to t64). After fetching all the data, the SPI/Master 11 sets the CS signal to the idle state (step S65 and time t65). Furthermore, the data output from the shift register 11-1 in step S63 is dummy and thus discarded (step S66 and time t66).

As described above, in the second embodiment, each divided data obtained by dividing a batch of data transmitted from the SPI/Master 11 to the M_SerDes 31 by the SPI communication into a plurality of pieces can be transmitted to the S_SerDes 41 through the UP Link in a plurality of frame periods of the TDD method, and each divided data obtained by dividing a batch of data transmitted from the SPI/Slave 12 to the S_SerDes 41 by the SPI communication can be transmitted to the M_SerDes 31 through the Down Link in a plurality of frame periods of the TDD method.

Third Embodiment

In a third embodiment, an SPI/Master 11 performs serial communication with a plurality of SPI/Slaves 12.

Figure 11:
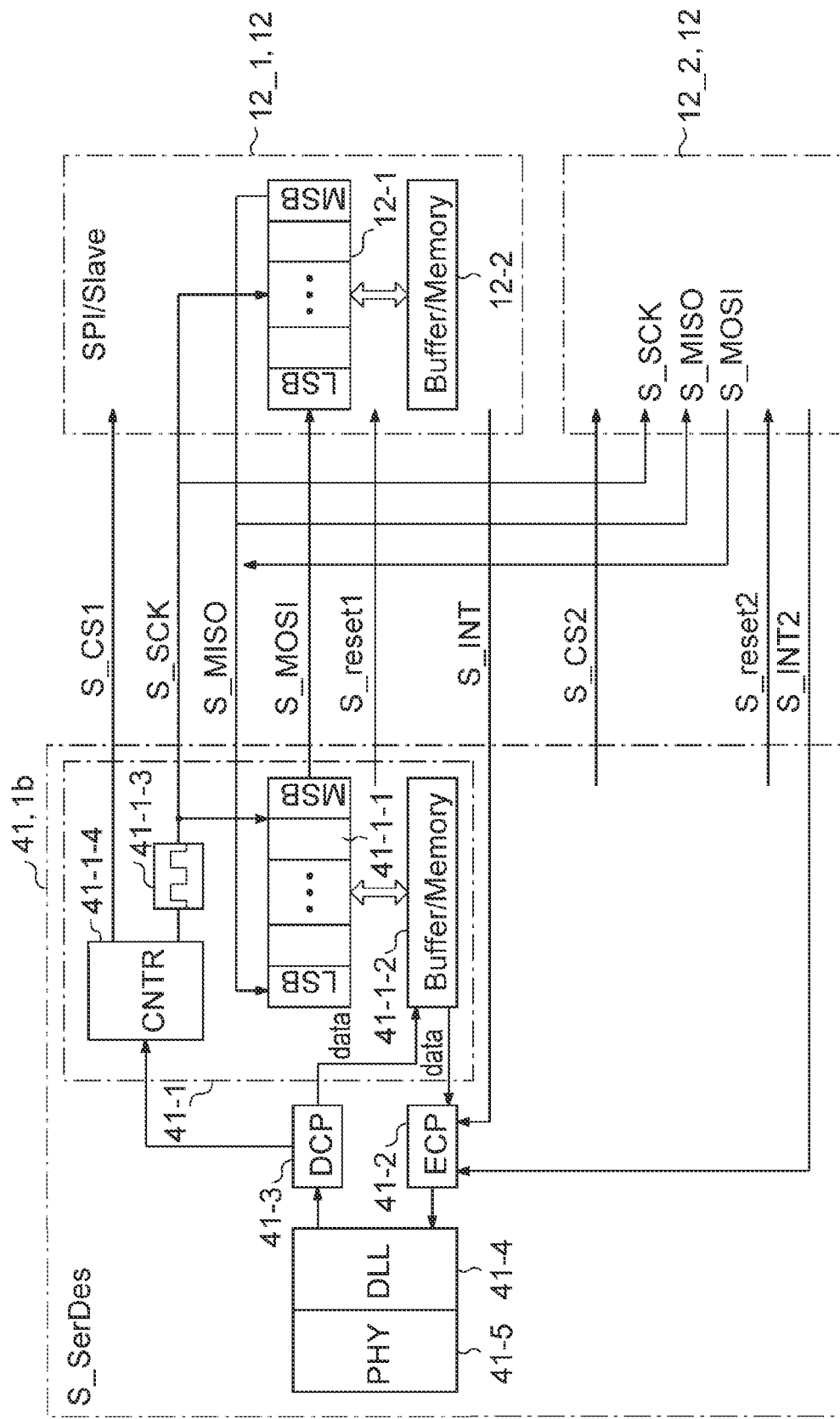
FIG. 11 is a block diagram of a main part of a communication system including a communication device according to a third embodiment.

FIG. 11 is a block diagram of a main part of a communication system 2 including a communication device according to the third embodiment. FIG. 11 illustrates an S_SerDes 41 and a plurality of SPI/Slaves 12.

Internal configurations of the SPI/Slave 12 and an M_SerDes 31 are similar to those in FIG. 1 and thus are omitted in FIG. 11. Furthermore, in FIG. 11, the same reference numerals are given to components common to those in FIG. 1.

The SPI/Master 11 designates a CSn signal of the SPI/Slave 12 to communicate with in SPI control information transmitted to the M_SerDes 31. A controller 41-1-4 in an S_SerDes 41 activates the CSn signal designated by the SPI/Master 11. FIG. 11 illustrates an example in which two SPI/Slave 12_1 and SPI/Slave 12_2 are connected to the S_SerDes 41.

The SPI/Master 11 sets the CSn signal in the SPI control signal to CS1 in a case of desiring data communication with the SPI/Slave 12_1. As a result, the controller 41-1-4 in the S_SerDes 41 activates an S_CS1 pin that outputs a CS1 signal. Since the CS1 signal from the S_CS1 pin is input to the SPI/Slave 12_1, SPI/Slave 12_1 receives SPI data in synchronization with S_SCK from S_SerDes 41 and transmits SPI data to S_SerDes 41 in synchronization with S_SCK.

Furthermore, the SPI/Master 11 sets the CSn signal in the SPI control signal to CS2 in a case of desiring data communication with the SPI/Slave 12_2. As a result, the controller 41-1-4 in the S_SerDes 41 activates an S_CS2 pin that outputs a CS2 signal. Since the CS2 signal from the S_CS2 pin is input to the SPI/Slave 12_2, SPI/Slave 12_2 receives SPI data in synchronization with S_SCK from the S_SerDes 41 and transmits the SPI data to the S_SerDes 41 in synchronization with the S_SCK.

Figure 12:
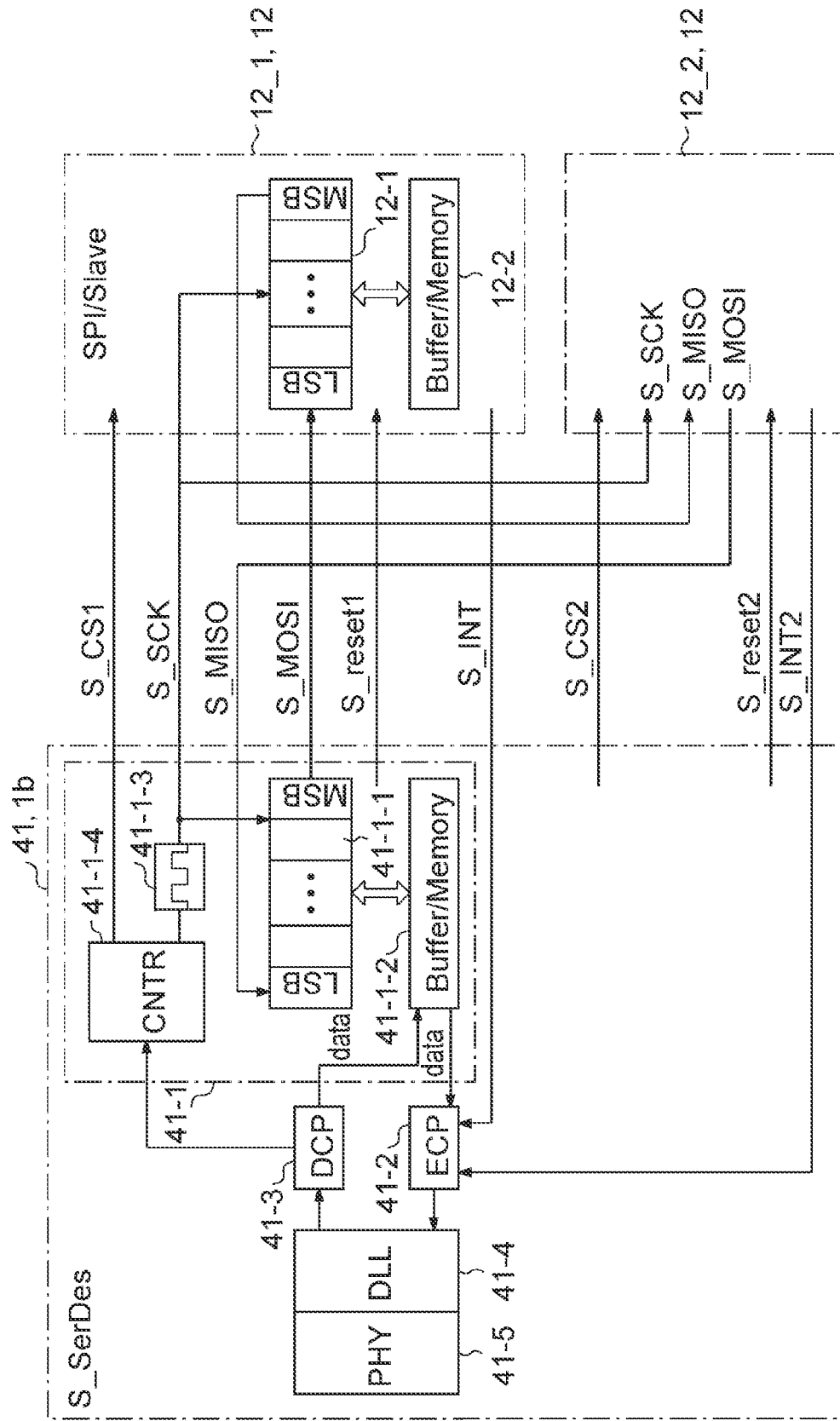
FIG. 12 is a block diagram of a main part of a communication system including a communication device according to a modification of FIG. 11.

In the communication system 2 of FIG. 11, an example has been illustrated in which the SPI/Master 11 designates the SPI/Slave 12 to communicate with by the CSn signal in the SPI control signal but as illustrated in FIG. 12, a plurality of SPI/Slaves 12 may be connected in a daisy chain.

FIG. 12 is a block diagram of a main part of a communication system 2 including a communication device according to a modification of FIG. 11. FIG. 12 illustrates two SPI/Slaves 12 capable of simultaneously performing serial communication with the SPI/Master 11, but three or more SPI/Slaves 12 may simultaneously perform serial communication with the SPI/Master 11. Shift registers 12-1 in the two SPI/Slaves 12_1 and 12_2 in FIG. 12 are daisy chained with each other, data output from an MSB of the shift register 12-1 in the SPI/Slave 12_2 in synchronization with SCK is input to an LSB of the shift register 12-1 in the SPI/Slave 12_1 and data output from the MSB is transmitted to the S_SerDes 41 by SPI communication.

In the communication device of FIG. 12, it is necessary to repeat processing of steps S24 to S26 of FIG. 6 by the number of SPIs/Slaves 12.

As described above, in the third embodiment, the SPI/Master 11 designates individual SPI/Slave 12 by the CSn signal in the SPI control information, so that it is possible to perform bidirectional serial communication with the plurality of SPI/Slaves 12. Furthermore, by daisy chaining the plurality of SPI/Slaves 12, the SPI/Master 11 can simultaneously perform serial communication with the plurality of SPI/Slaves 12.

Note that the present technology can also have the following configurations.

(1) A communication device including: a communication unit configured to transmit a serial signal group conforming to a serial peripheral interface (SPI) and transmitted from a master in synchronization with a clock to a communication partner device as a batch of data blocks within one frame period of a predetermined communication protocol, or transmit the serial signal group to the communication partner device as a plurality of data blocks divided according to a plurality of frame periods.

(2) The communication device according to (1), further including:
- a memory configured to store a first serial signal group conforming to the SPI and transmitted from the master in synchronization with the clock, and store a second serial signal group conforming to the SPI and transmitted from a slave in synchronization with the clock;
- a packet encoder configured to convert the first serial signal group stored in the memory into a first packet of the predetermined communication protocol; and
- a packet decoder configured to convert a second packet of the predetermined communication protocol received from the communication partner device into the second serial signal group.

(3) The communication device according to (2), in which the first packet includes frequency information of the clock, polarity information, and phase information of the clock with respect to a data signal of the first serial signal group confirming to the SPI.

(4) The communication device according to (2) or (3), in which the first packet includes information indicating that the batch of data blocks is included within the one frame period, or information indicating that the plurality of data blocks divided according to the plurality of frame periods is included.

(5) The communication device according to (4), in which, in a case where the first packet includes the plurality of data blocks, the first packet includes a total number of the plurality of data blocks and division position information of the data blocks.

(6) The communication device according to (4) or (5), in which the first packet includes size information of the data block.

(7) The communication device according to any one of (2) to (6), in which the first packet includes information indicating whether the data block is valid or invalid.

(8) The communication device according to any one of (2) to (7), in which the first packet includes information indicating that the slave is reset.

(9) The communication device according to any one of (2) to (8), in which the second packet includes at least one of information indicating an operation state of the slave and interrupt information from the slave.

(10) The communication device according to (9), in which the memory determines that the slave requests readout of a state of the slave and transmits an interrupt signal to the master in a case where the interrupt information is included in the second packet or in a case where the second packet itself arrives at the memory from the communication partner device.

(11) The communication device according to any one of (2) to (10), in which the first packet includes information of a slave select signal included in the first serial signal group conforming to the SPI for selecting the communication partner device or the slave.

(12) The communication device according to (11), in which the packet encoder transmits the first packet to the communication partner device or the slave selected by the slave select signal as a destination.

(13) The communication device according to any one of (2) to (12), further including: a shift register configured to sequentially store each serial signal included in the first serial signal group in the memory in synchronization with the clock, and sequentially transmit each serial signal included in the second serial signal group to the master in synchronization with the clock.

(14) The communication device according to any one of (2) to (13), in which the communication unit transmits the first packet at first timing defined by the predetermined communication protocol and receives the second packet at second timing defined by the predetermined communication protocol.

(15) The communication device according to any one of (2) to (14), in which the packet encoder determines that transmission of the first serial signal group from the master is completed when a slave select signal transmitted from the master transitions from a first logic to a second logic.

(16) The communication device according to any one of (2) to (15), in which the communication unit transmits and receives the first packet and the second packet to and from the communication partner device using the communication protocol according to time division duplex (TDD).

(17) A communication device including: a communication unit configured to transmit a serial signal group conforming to an SPI and transmitted from a slave in synchronization with a clock generated on the basis of clock frequency information included in a packet from a communication partner device to the communication partner device as a batch of data blocks within one frame period of a predetermined communication protocol, or transmit the serial signal group to the communication partner device as a plurality of data blocks divided according to a plurality of frame periods.

(18) The communication device according to (17), further including:
- a packet decoder configured to convert a first packet of
- a predetermined communication protocol received from the communication partner device into a first serial signal group conforming to the SPI;
- a clock generator configured to generate the clock on the basis of the clock frequency information included in the first serial signal group;
- a memory configured to store the first serial signal group in synchronization with the clock, and store a second serial signal group conforming to the SPI and transmitted from the slave in synchronization with the clock; and
- a packet encoder configured to convert the second serial signal group stored in the memory into a second packet of the predetermined communication protocol.

(19) The communication device according to (18), in which the second packet includes information indicating that a batch of data blocks transmitted within one frame period of the second serial signal group is included, or information indicating that a plurality of data blocks divided and transmitted according to a plurality of frame periods is included.

(20) The communication device according to (18) or (19), in which the second packet includes information indicating whether or not the slave is in a busy state in which the slave is not able to receive the first serial signal group, and information indicating whether or not there is an error in the first serial signal group received by the slave.

(21) The communication device according to any one of (18) to (20), in which the second packet includes interrupt information requesting that a master read a state of the slave.

(22) The communication device according to any one of (18) to (21), further including: a shift register configured to store each serial signal included in the second serial signal group in the memory, and transmit each serial signal included in the first serial signal group to the slave.

(23) The communication device according to any one of (18) to (22), in which the communication unit transmits the second packet at first timing defined by the predetermined communication protocol and receives the first packet at second timing defined by the predetermined communication protocol.

(24) The communication device according to any one of (18) to (23), in which the communication unit transmits and receives the first packet and the second packet to and from the communication partner device using the communication protocol according to time division duplex (TDD).

(25) A communication system including:
a first communication device and a second communication device that transmit and receive a packet according to a predetermined communication protocol, in which
the first communication device includes a first communication unit that transmits a first serial signal group conforming to a serial peripheral interface (SPI) and transmitted from a master in synchronization with a clock to the second communication device as a batch of data blocks within one frame period of a predetermined communication protocol, or transmits the first serial signal group to the second communication device as a plurality of data blocks divided according to a plurality of frame periods, and
the second communication device transmits a second serial signal group conforming to the SPI and transmitted from a slave in synchronization with a clock generated on the basis of clock frequency information included in the packet transmitted from the first communication device to the first communication device as a batch of data blocks within one frame period of the predetermined communication protocol, or transmits the second serial signal group to the first communication device as a plurality of data blocks divided according to a plurality of frame periods.

(26) The communication system according to (25), in which the first communication device includes
a first memory that stores the first serial signal group transmitted from the master in synchronization with a first clock and stores the second serial signal group transmitted from the slave in synchronization with the first clock,
a first packet encoder that converts the first serial signal group stored in the first memory into a first packet of the predetermined communication protocol,
a first packet decoder that converts a second packet of the predetermined communication protocol received from the second communication device into the second serial signal group, and
the first communication unit that transmits the first packet at timing defined in the predetermined communication protocol and receives the second packet at timing defined in the predetermined communication protocol, and
the second communication device includes
a second packet decoder that converts the received first packet into the first serial signal group,
a clock generator that generates a second clock on the basis of the clock frequency information included in the first serial signal group,
a second memory that stores the first serial signal group in synchronization with the second clock and stores the second serial signal group transmitted from the slave in synchronization with the second clock,
a packet encoder that converts the second serial signal group stored in the second memory into the second packet, and
a second communication unit that transmits the second packet at timing defined in the predetermined communication protocol and receives the first packet at timing defined in the predetermined communication protocol.

A communication method including: a communication unit configured to transmit a serial signal group conforming to an SPI and transmitted from a master in synchronization with a clock to a communication partner device as a batch of data blocks within one frame period of a predetermined communication protocol, or transmit the serial signal group to the communication partner device as a plurality of data blocks divided according to a plurality of frame periods.

The aspects of the present disclosure are not limited to the above-described individual embodiments, but also include various modifications that can be conceived by those skilled in the art, and the effects of the present disclosure are not limited to the above-described content. That is, various additions, changes, and partial deletions are possible without departing from the conceptual idea and purpose of the present disclosure derived from the content defined in the claims and its equivalents.

REFERENCE SIGNS LIST

1a Communication device
1b Communication device
2 Communication system
11 SPI/Master
11-1 Sequential shift register
11-1 Shift register
11-2 Buffer/memory
11-3 Controller
11-4 SCK generator
12 SPI/Slave
12-1 Shift register
12-2 Buffer/memory
31 M_SerDes
31-1 SPI block
31-1-1 Shift register
31-1-2 Buffer/memory
31-3 Packet decoder (DCP)
31-5 PHY layer block
32 Peripheral devices
41 S_SerDes
41-1 SPI block
41-1-1 Shift register
41-1-2 Buffer/memory
41-1-3 SCK generator
41-1-4 Controller
41-2 Packet encoder (ECP)
41-3 packet decoder (DCP)
41-4 Link layer block (DLL)
41-5 PHY layer block
42 Peripheral devices
51 SPI packet
52 UP Link packet
53 SPI packet
54 Down Link packet
103 Cable

The invention claimed is:

1. A communication device comprising:
communication circuitry configured to transmit a serial signal group conforming to a serial peripheral interface (SPI) and transmitted from a master in synchronization with a clock to a communication partner device as a batch of data blocks within one frame period of a predetermined communication protocol, or transmit the serial signal group to the communication partner device as a plurality of data blocks divided according to a plurality of frame periods;

a memory configured to store a first serial signal group conforming to the SPI and transmitted from the master in synchronization with the clock, and store a second serial signal group conforming to the SPI and transmitted from a slave in synchronization with the clock;

a packet encoder configured to convert the first serial signal group stored in the memory into a first packet of the predetermined communication protocol; and a packet decoder configured to convert a second packet of the predetermined communication protocol received from the communication partner device into the second serial signal group, wherein the first packet includes frequency information of the clock, polarity information, and phase information of the clock with respect to a data signal of the first serial signal group confirming to the SPI.

2. The communication device according to claim 1, wherein the first packet includes information of a slave select signal included in the first serial signal group conforming to the SPI for selecting the communication partner device or the slave.

3. The communication device according to claim 2, wherein the packet encoder transmits the first packet to the communication partner device or the slave selected by the slave select signal as a destination.

4. A communication device comprising:
communication circuitry configured to transmit a serial signal group conforming to a serial peripheral interface (SPI) and transmitted from a master in synchronization with a clock to a communication partner device as a batch of data blocks within one frame period of a predetermined communication protocol, or transmit the serial signal group to the communication partner device as a plurality of data blocks divided according to a plurality of frame periods;

a memory configured to store a first serial signal group conforming to the SPI and transmitted from the master in synchronization with the clock, and store a second serial signal group conforming to the SPI and transmitted from a slave in synchronization with the clock;

a packet encoder configured to convert the first serial signal group stored in the memory into a first packet of the predetermined communication protocol; and a packet decoder configured to convert a second packet of the predetermined communication protocol received from the communication partner device into the second serial signal group, wherein the first packet includes information indicating that the batch of data blocks is included within the one frame period, or information indicating that the plurality of data blocks divided according to the plurality of frame periods is included.

5. The communication device according to claim 4, wherein, in a case where the first packet includes the plurality of data blocks, the first packet includes a total number of the plurality of data blocks and division position information of the data blocks.

6. The communication device according to claim 4, wherein the first packet includes size information of the data block.

7. A communication device comprising:
communication circuitry configured to transmit a serial signal group conforming to a serial peripheral interface (SPI) and transmitted from a master in synchronization with a clock to a communication partner device as a batch of data blocks within one frame period of a predetermined communication protocol, or transmit the serial signal group to the communication partner device as a plurality of data blocks divided according to a plurality of frame periods;

a memory configured to store a first serial signal group conforming to the SPI and transmitted from the master in synchronization with the clock, and store a second serial signal group conforming to the SPI and transmitted from a slave in synchronization with the clock;

a packet encoder configured to convert the first serial signal group stored in the memory into a first packet of the predetermined communication protocol; and a packet decoder configured to convert a second packet of the predetermined communication protocol received from the communication partner device into the second serial signal group, wherein the first packet includes information indicating whether the data block is valid or invalid.

8. A communication device comprising:
communication circuitry configured to transmit a serial signal group conforming to a serial peripheral interface (SPI) and transmitted from a master in synchronization with a clock to a communication partner device as a batch of data blocks within one frame period of a predetermined communication protocol, or transmit the serial signal group to the communication partner device as a plurality of data blocks divided according to a plurality of frame periods;

a memory configured to store a first serial signal group conforming to the SPI and transmitted from the master in synchronization with the clock, and store a second serial signal group conforming to the SPI and transmitted from a slave in synchronization with the clock;

a packet encoder configured to convert the first serial signal group stored in the memory into a first packet of the predetermined communication protocol; and a packet decoder configured to convert a second packet of the predetermined communication protocol received from the communication partner device into the second serial signal group, wherein the first packet includes information indicating that the slave is reset.

9. The communication device according to claim 8, wherein the second packet includes at least one of information indicating an operation state of the slave and interrupt information from the slave.

10. The communication device according to claim 9, wherein the memory determines that the slave requests readout of a state of the slave and transmits an interrupt signal to the master in a case where the interrupt information is included in the second packet or in a case where the second packet itself arrives at the memory from the communication partner device.

11. A communication device comprising:
communication circuitry configured to transmit a serial signal group conforming to a serial peripheral interface (SPI) and transmitted from a master in synchronization with a clock to a communication partner device as a batch of data blocks within one frame period of a predetermined communication protocol, or transmit the serial signal group to the communication partner device as a plurality of data blocks divided according to a plurality of frame periods;

a memory configured to store a first serial signal group conforming to the SPI and transmitted from the master in synchronization with the clock, and store a second serial signal group conforming to the SPI and transmitted from a slave in synchronization with the clock;

a packet encoder configured to convert the first serial signal group stored in the memory into a first packet of the predetermined communication protocol;

a packet decoder configured to convert a second packet of the predetermined communication protocol received from the communication partner device into the second serial signal group; and a shift register configured to sequentially store each serial signal included in the first serial signal group in the memory in synchronization with the clock, and sequentially transmit each serial signal included in the second serial signal group to the master in synchronization with the clock.

12. The communication device according to claim 11, wherein the communication circuitry transmits the first packet at first timing defined by the predetermined communication protocol and receives the second packet at second timing defined by the predetermined communication protocol.

13. The communication device according to claim 11, wherein the packet encoder determines that transmission of the first serial signal group from the master is completed when a slave select signal transmitted from the master transitions from a first logic level to a second logic level.

14. The communication device according to claim 11, wherein the communication circuitry transmits and receives the first packet and the second packet to and from the communication partner device using the communication protocol according to time division duplex (TDD).

15. A communication device comprising:
communication circuitry configured to transmit a serial signal group conforming to a serial peripheral interface (SPI) and transmitted from a slave in synchronization with a clock generated on a basis of clock frequency information included in a packet from a communication partner device to the communication device as a batch of data blocks within one frame period of a predetermined communication protocol, or transmit the serial signal group to the communication partner device as a plurality of data blocks divided according to a plurality of frame periods.

16. The communication device according to claim 15, further comprising:
a packet decoder configured to convert a first packet of a predetermined communication protocol received from the communication partner device into a first serial signal group conforming to the SPI;

a clock generator configured to generate the clock on a basis of the clock frequency information included in the first serial signal group;

a memory configured to store the first serial signal group in synchronization with the clock, and store a second serial signal group conforming to the SPI and transmitted from the slave in synchronization with the clock; and a packet encoder configured to convert the second serial signal group stored in the memory into a second packet of the predetermined communication protocol.

17. The communication device according to claim 16, wherein the second packet includes information indicating that a batch of data blocks transmitted within one frame period of the second serial signal group is included, or information indicating that a plurality of data blocks divided and transmitted according to a plurality of frame periods is included.

18. The communication device according to claim 16, wherein the second packet includes information indicating whether or not the slave is in a busy state in which the slave is not able to receive the first serial signal group, and information indicating whether or not there is an error in the first serial signal group received by the slave.

* * * * *